US011632554B2

(12) United States Patent
Huo et al.

(10) Patent No.: US 11,632,554 B2
(45) Date of Patent: Apr. 18, 2023

(54) INTER PREDICTION METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Yanzhuo Ma, Dongguan (CN); Shuai Wan, Dongguan (CN); Fuzheng Yang, Dongguan (CN); Qihong Ran, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/710,475

(22) Filed: Mar. 31, 2022

(65) Prior Publication Data
US 2022/0224910 A1 Jul. 14, 2022

Related U.S. Application Data

(63) Continuation of application No. PCT/CN2019/130838, filed on Dec. 31, 2019.

(51) Int. Cl.
 *H04N 19/137* (2014.01)
 *H04N 19/132* (2014.01)
 (Continued)

(52) U.S. Cl.
 CPC ......... *H04N 19/137* (2014.11); *H04N 19/132* (2014.11); *H04N 19/159* (2014.11); *H04N 19/176* (2014.11)

(58) Field of Classification Search
 CPC .. H04N 19/137; H04N 19/132; H04N 19/159; H04N 19/176
 See application file for complete search history.

(56) References Cited

U.S. PATENT DOCUMENTS 9,558,543 B2   1/2017   Hsieh et al.
2010/0118959 A1  5/2010  Lou et al.
(Continued)

FOREIGN PATENT DOCUMENTS

CN   106210501 A   12/2016

OTHER PUBLICATIONS

International Search Report dated Sep. 28, 2020 In Application No. PCT/CN2019/130838.
(Continued)

*Primary Examiner* — Hesham K Abouzahra
(74) *Attorney, Agent, or Firm* — Perkins Coie LLP

(57) ABSTRACT

Provide are an inter prediction method, encoder, decoder, and storage medium. Said method comprises: determining a prediction mode parameter of the current block; when the prediction mode parameter indicates a geometrical partitioning prediction mode is used for determining inter prediction of the current block, determining a geometrical partitioning prediction mode parameter of the current block; according to the geometrical partitioning prediction mode parameter, determining a first and a second prediction value and a weight index corresponding to the sample in the current block; clipping the weight index corresponding to the sample in the current block to obtain absolute information of the weight index; determining a first and a second weight value based on absolute information of the weight index; and determining an inter prediction of the sample of the current block according to weighted combination of the first prediction value, first weight value, second prediction value and second weight value.

16 Claims, 9 Drawing Sheets

(51) Int. Cl.
    *H04N 19/159*     (2014.01)
    *H04N 19/176*     (2014.01)

(56) References Cited

U.S. PATENT DOCUMENTS

2010/0208818 A1     8/2010     Yin et al.
2021/0195200 A1*     6/2021     Chen .................... H04N 19/42

OTHER PUBLICATIONS

Esenlik et al., Non-CE4: Geometrical partitioning for inter blocks, Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET—O0489-v4; 9 pages.

Blasi et al., CE4-1.10: CIIP with triangular partitions + GEO, Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0070; 3 pages.

Gao et al., CE4-Related: Geometric Merge Mode (GEO) Simplifications, Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0107-v3, 9 pages.

ITU-T, H.266, Telecommunication Standardization Sector of ITU (Aug. 2020), Series H: Audiovisual and Multimedia Systems, Infrastructure of audiovisual services—Coding of moving video, 516 pages.

Bross, Benjamin, Versatile Video Coding (Draft 7), Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P2001-vE, 494 pages.

Examination Report for Indian Application No. 202217016700 dated Aug. 25, 2022. 6 pages with English translation.

* cited by examiner

Determine position information of a sample in a current block according to size information of the current block — S1041

Determine a weight index corresponding to the sample in the current block in combination with the position information of the sample in the current block respectively according to angle index information and a preset angle mapping table — S1042

FIG. 7

INTER PREDICTION METHOD, ENCODER, DECODER, AND STORAGE MEDIUM

CROSS-REFERENCE TO RELATED APPLICATION

The present application is a continuation application of International PCT Application No. PCT/CN2019/130838, filed on Dec. 31, 2019, the entire content of which is hereby incorporated by reference.

TECHNICAL FIELD

Embodiments of the present application relate to video coding technology, and relate to, but are not limited to, an inter predication method, an encoder, a decoder, and a storage medium.

BACKGROUND

In video encoding and decoding, in addition to intra prediction, inter prediction may also be used during encoding and decoding of the current block. Inter prediction may include motion estimation and motion compensation. For motion compensation, an inter current block may be partitioned into two non-rectangular partitions, which are used in prediction of the current block respectively and then weighted and integrated, using geometrical partitioning for inter blocks (GEO), to obtain a prediction value of the current block.

In the prior art, an angle mapping table and a weight mapping table need to be used in a prediction process of GEO. When the current block is predicted, the length of a weight mapping table of one partition is 27, and the total length of the mapping tables of the two partitions is 54. However, corresponding weight values of these 54 weights are composed of {4, 5, 6, 7, 8}.

However, there are many duplicate weights in the existing weight mapping table, and weight tables are too lengthy, such that the storage overhead of data during inter prediction is large and texts and codes are complicated.

SUMMARY

Embodiments of the present application provides an inter prediction method, an encoder, a decoder and a storage medium, so as to simplify texts and codes during inter prediction and decrease the storage overhead of data.

In a first aspect, an embodiment of the present application provides an inter prediction method, which is applied to an encoder and includes: determining a prediction mode parameter of a current block; determining a geometrical partitioning for inter blocks (GEO) parameter of the current block when the prediction mode parameter indicates that a GEO mode is used for determining inter prediction of the current block; determining a first prediction value corresponding to a first partition of the current block and a second prediction value corresponding to a second partition of the current block according to the GEO parameter; determining a weight index corresponding to a sample in the current block according to the GEO parameter; clipping the weight index corresponding to the sample in the current block respectively to obtain absolute information of the weight index corresponding to the sample in the current block, wherein the clipping is to clip a maximum value among absolute values of weight indices corresponding to samples in the current block to half of a preset numerical value; determining a first weight value of the sample in the current block and a second weight value of the sample in the current block based on the absolute information of the weight index corresponding to the sample in the current block; and performing weighted combination using the first prediction value, the first weight value, the second prediction value and the second weight value to obtain an inter prediction of the sample of the current block.

In a second aspect, an embodiment of the present application provides an inter prediction method, which is applied to a decoder and includes: parsing a bitstream to determine a prediction mode parameter of a current block; parsing the bitstream to determine a geometrical partitioning for inter blocks (GEO) parameter of the current block when the prediction mode parameter indicates that a GEO mode is used for determining inter prediction of the current block; determining a first prediction value corresponding to a first partition of the current block and a second prediction value corresponding to a second partition of the current block according to the GEO parameter; determining a weight index corresponding to a sample in the current block according to the GEO parameter; clipping the weight index corresponding to the sample in the current block respectively to obtain absolute information of the weight index corresponding to the sample in the current block, wherein the clipping is to clip a maximum value among weight indices corresponding to samples in the current block to half of a preset numerical value; determining a first weight value of the sample in the current block and a second weight value of the sample in the current block based on the absolute information of the weight index corresponding to the sample in the current block; and performing weighted combination using the first prediction value, the first weight value, the second prediction value and the second weight value to obtain an inter prediction of the sample of the current block.

In a third aspect, an embodiment of the present application provides an encoder including: a first determining unit, a first clipping unit and a first prediction unit.

The first determining unit is configured to determine a prediction mode parameter of a current block; determine a geometrical partitioning for inter blocks (GEO) parameter of the current block when the prediction mode parameter indicates that a GEO mode is used for determining inter prediction of the current block; determine a first prediction value corresponding to a first partition of the current block and a second prediction value corresponding to a second partition of the current block according to the GEO parameter; and determine a weight index corresponding to the sample in the current block according to the GEO parameter.

The first clipping unit is configured to clip the weight index corresponding to the sample in the current block respectively to obtain absolute information of the weight index corresponding to the sample in the current block, wherein the clipping is to clip a maximum value among absolute values of weight indices corresponding to samples in the current block to half of a preset numerical value.

The first determining unit is further configured to determine a first weight value of the sample in the current block and a second weight value of the sample in the current block based on the absolute information of the weight index corresponding to the sample in the current block.

The first prediction unit is configured to perform weighted combination using the first prediction value, the first weight value, the second prediction value and the second weight value to obtain an inter prediction of the sample of the current block.

In a fourth aspect, an embodiment of the present application provides a decoder including: a parsing unit, a second determining unit, a second clipping unit and a second prediction unit.

The parsing unit is configured to parse a bitstream and determine a prediction mode parameter of a current block.

The second determining unit is configured to parse the bitstream and determine a geometrical partitioning for inter blocks (GEO) parameter of the current block when the prediction mode parameter indicates that a GEO mode is used for determining inter prediction of the current block; determine a first prediction value corresponding to a first partition of the current block and a second prediction value corresponding to a second partition of the current block according to the GEO parameter; and determine a weight index corresponding to the sample in the current block according to the GEO parameter.

The second clipping unit is configured to clip the weight index corresponding to the sample in the current block respectively to obtain absolute information of the weight index corresponding to the sample in the current block, wherein the clipping is to clip a maximum value among weight indices corresponding to samples in the current block to half of a preset numerical value.

The second determining unit is further configured to determine a first weight value of the samples in the current block and a second weight value of the sample in the current block based on the absolute information of the weight index corresponding to the sample in the current block.

The second prediction unit is configured to perform weighted combination using the first prediction value, the first weight value, the second prediction value and the second weight value to obtain an inter prediction of the sample of the current block.

In a fifth aspect, an embodiment of the present application further provides an encoder including: a first memory and a first processor, wherein the first memory stores therein a computer program runnable on the first processor, which, when executed by the first processor, implements the inter prediction method of the encoder.

In a sixth aspect, an embodiment of the present application further provides a decoder including: a second memory and a second processor, wherein the second memory stores therein a computer program runnable on the first processor, which, when executed by the first processor, implements the inter prediction method of the decoder.

In a seventh aspect, an embodiment of the present application provides a storage medium storing therein a computer program, which, when executed by the first processor, implements the inter prediction method of the encoder; or when executed by the second processor, implements the inter prediction method of the decoder.

The embodiments of the present application provide an inter prediction method, an encoder, a decoder and a storage medium. The inter prediction method includes determining a prediction mode parameter of a current block; determining a geometrical partitioning for inter blocks (GEO) parameter of the current block when the prediction mode parameter indicates that a GEO mode is used for determining inter prediction of the current block; determining a first prediction value corresponding to a first partition of the current block and a second prediction value corresponding to a second partition of the current block according to the GEO parameter; determining a weight index corresponding to the sample in the current block according to the GEO parameter; clipping the weight index corresponding to the sample in the current block respectively to obtain absolute information of the weight index corresponding to the sample in the current block, wherein the clipping is to clip the maximum value among absolute values of weight indices corresponding to samples in the current block to half of a preset numerical value; determining a first weight value of the sample in the current block and a second weight value of the sample in the current block based on the absolute information of the weight index corresponding to the sample in the current block; and performing weighted combination using the first prediction value, the first weight value, the second prediction value and the second weight value to obtain an inter prediction of the sample of the current block. Using the technology of implementing the above scheme, during inter prediction, the encoder can determine the weight index corresponding to the sample in the current block according to the GEO parameter and then clip the maximum value among the absolute values of weight indices corresponding to samples in the current block to half of the preset numerical value through clipping processing of the absolute values, such that the size of the original clipping to half of the preset numerical value is reduced, thus the storage and use of weight values corresponding to the absolute information of half of the weight indices are reduced, further simplifying texts and codes during inter prediction and decreasing the storage overhead of data.

BRIEF DESCRIPTION OF DRAWINGS

FIG. 6A is a schematic diagram of exemplary first weight values of luminance in accordance with an embodiment of the present application.

FIG. 6B is a schematic diagram of exemplary first weight values of chromaticity in accordance with an embodiment of the present application.

FIG. 7 is a schematic flowchart of a second implementation of an intra prediction method in accordance with an embodiment of the present application.

DETAILED DESCRIPTION

Figure 1:
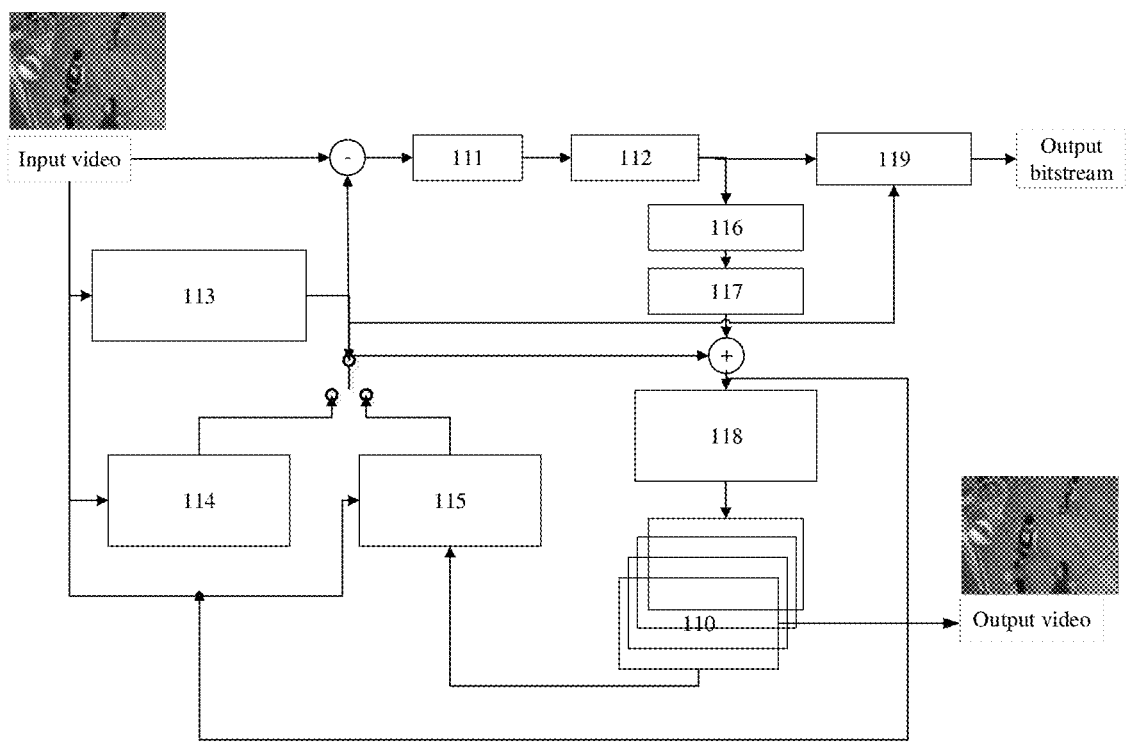
FIG. 1 is a schematic composition block diagram of a video encoding system in accordance with an embodiment of the present application.

The present application provides a video encoding system 11 as shown in FIG. 1, which includes: a transform unit 111, a quantization unit 112, a mode selection and encoding control logic unit 113, an intra prediction unit 114, an inter prediction unit 115 (including motion compensation and motion estimation), an inverse quantization unit 116, an inverse transform unit 117, a loop filter unit 118, an encoding unit 119 and a decoded picture buffer unit 110. For an input original video signal, a video reconstruction block may be obtained by partitioning a coding tree unit (CTU), and an encoding mode is determined by the mode selection and encoding control logic unit 113. Then for residual sample information obtained after intra or inter prediction, the video reconstruction block is transformed (including the residual information being transformed from the pixel domain to the transform domain) by the transform unit 111 and the obtained transform coefficients are quantized by the quantization unit 112, to further reduce a bit rate. The intra prediction unit 114 is configured to perform intra prediction of the video reconstruction block. The intra prediction unit 114 is configured to determine an optimal intra prediction mode (i.e., a target prediction mode) of the video reconstruction block. The inter prediction unit 115 is configured to perform inter prediction encoding of the received video reconstruction block relative to one or more blocks in one or more reference frames to provide time prediction information. The motion estimation is a process of generating a motion vector which may be used to estimate motion of the video reconstruction block, and then the motion compensation is performed based on the motion vector determined by the motion estimation. After determining an inter prediction mode, the inter prediction unit 115 is further configured to provide the selected inter prediction data to the encoding unit 119, and send the calculated motion vector data to the encoding unit 119 as well. In addition, the inverse quantization unit 116 and the inverse transformation unit 117 are configured to reconstruct the video reconstruction block, reconstruct residual blocks in the pixel domain. and blocking artifacts of the reconstructed residual blocks are removed by the loop filtering unit 118, and then the reconstructed residual blocks are added into a predictive block in a frame of the decoded picture buffer unit 110 to generate the reconstructed video reconstruction block. The encoding unit 119 is configured to encode various encoding parameters and the quantized transform coefficients. The decoded picture buffer unit 110 is configured to store the reconstructed video reconstruction block for prediction reference. With the progress of video picture encoding, new reconstructed video reconstruction blocks will be generated continuously, and will all be stored in the decoded picture buffer unit 110.

Figure 2:
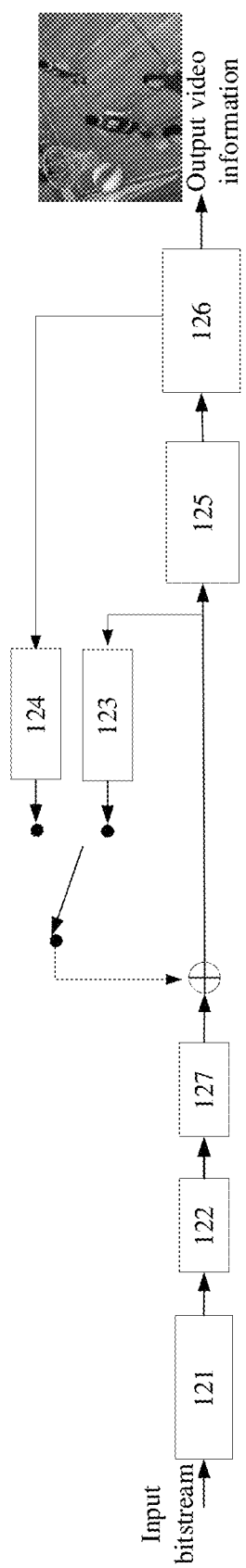
FIG. 2 is a schematic composition block diagram of a video decoding system in accordance with an embodiment of the present application.

An embodiment of the present application provides a video decoding system. FIG. 2 is a schematic diagram of a compositional structure of a video decoding system in accordance with an embodiment of the present application. As shown in FIG. 2, the video decoding system 12 includes: a decoding unit 121, an inverse transform unit 127, an inverse quantization unit 122, an intra prediction unit 123, a motion compensation unit 124, a loop filter unit 125 and a decoded picture buffer unit 126. After an input video signal is encoded by the video encoding system 11, a bitstream of the video signal is output. When the bitstream is input into the video decoding system 12, it first passes through the decoding unit 121 to obtain the decoded transform coefficients. The transform coefficients are processed by the inverse transform unit 127 and the inverse quantization unit 122 to generate residual blocks in the pixel domain. The intra prediction unit 123 may be configured to generate prediction data of the current video decoding block based on the determined intra prediction direction and data from a previous decoding block of the current frame or picture. The motion compensation unit 124 determines prediction information for the video decoding block by analyzing a motion vector and other associated syntax elements, and uses the prediction information to generate a predictive block of the video decoding block being decoded. A decoded video block is formed by summing the residual block from the inverse transform unit 127 and the inverse quantization unit 122 and the corresponding predictive block generated by the intra prediction unit 123 or the motion compensation unit 124. Blocking artifacts of the decoded video signal are removed by the loop filter unit 125, such that the video quality can be improved. Then, the decoded video block is stored in the decoded picture buffer unit 126, which stores reference pictures used for subsequent intra prediction or motion compensation, and the decoded picture buffer unit 126 is also configured to output the video signal to obtain the restored original video signal.

An inter prediction method in accordance with the embodiment of the present application is mainly applied to the inter prediction unit 115 of the video encoding system 11 and the inter prediction unit, i.e., the motion compensation unit 124, of the video decoding system 12. That is to say, if a better prediction effect can be obtained in the video encoding system 11 using the inter prediction method in accordance with the embodiment of the present application, then accordingly, the video decoding restoration quality can be improved at a decoder as well. Based on this, the technical schemes of the present application will be further set forth in detail in conjunction with the drawings and embodiments. Before the elaborating, it should be noted that "first", "second" and "third" mentioned throughout the specification are only for the purpose of distinguishing different features, and are not intended to limit priority, sequence or size relationship, or the like.

An inter prediction method in accordance with an embodiment of the present application is applied to a video encoding device, i.e., an encoder. Functions implemented by the method may be implemented by a processor in the video encoding device by invoking program codes. Of course, the program codes may be stored in a computer storage medium. It is thus seen that the video encoding device at least includes a processor and a storage medium.

Figure 3:
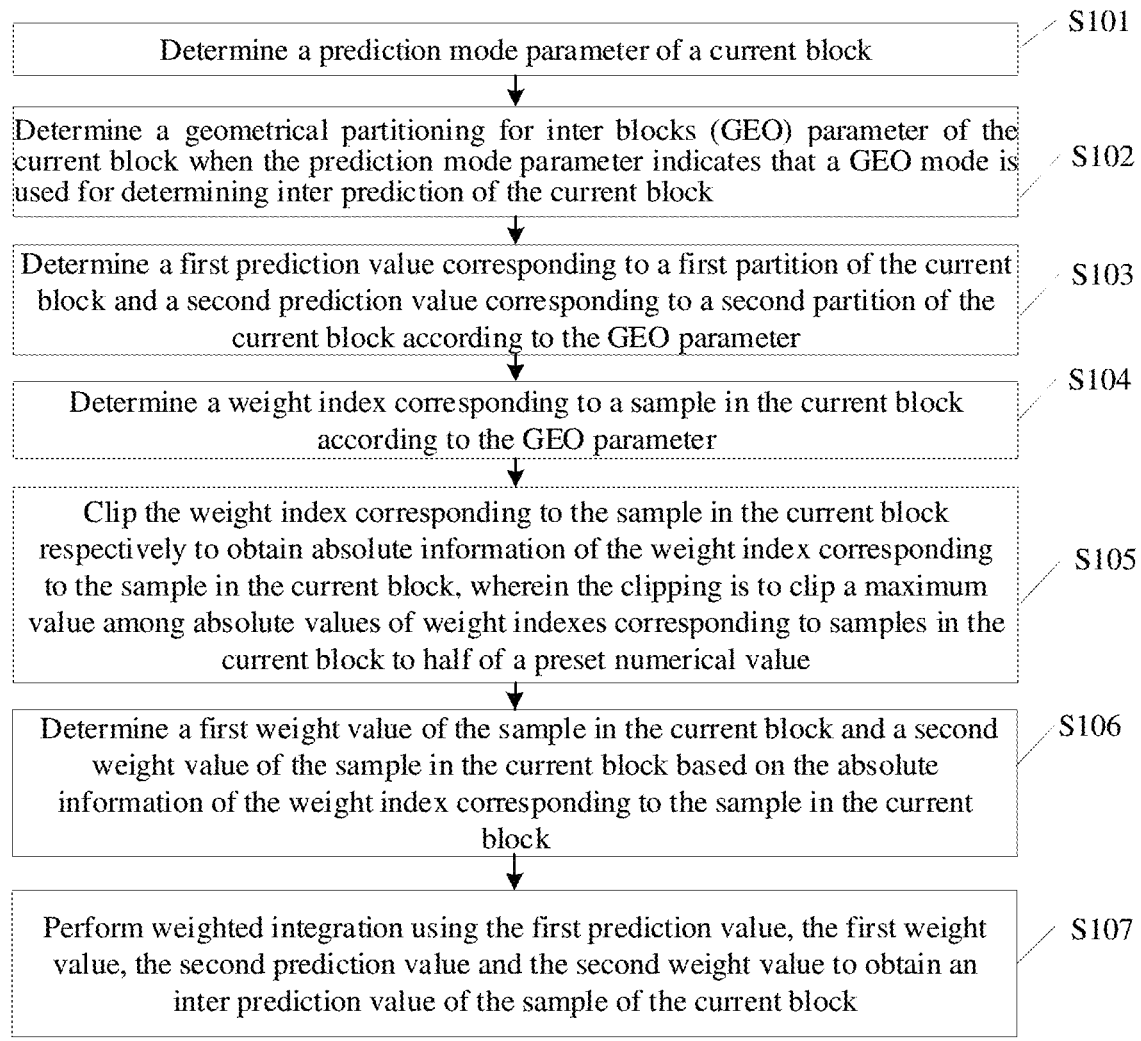
FIG. 3 is a schematic flowchart of a first implementation of an intra prediction method in accordance with an embodiment of the present application.
Figure 4A:
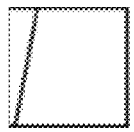
FIGS. 4A-4G are schematic diagrams of 7 exemplary partition modes in accordance with an embodiment of the present application.
Figure 4B:
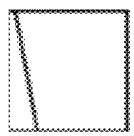
Figure 4C:
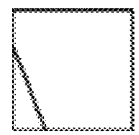
Figure 4D:
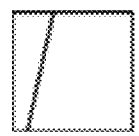
Figure 4E:
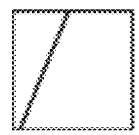
Figure 4F:
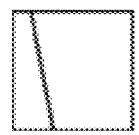
Figure 4G:
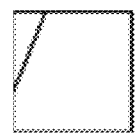

FIG. 3 is a schematic flowchart of an implementation of an intra prediction method in accordance with an embodiment of the present application. As shown in FIG. 3, the method includes the following acts S101-S107.

In S101, a prediction mode parameter of a current block is determined.

In an embodiment of the present application, a video picture may be partitioned into a plurality of picture blocks, and each of the picture blocks to be encoded at present may be called a coding block (CB), wherein each coding block may include a first picture component, a second picture component and a third picture component. The current block is a coding block, of which the first picture component, the second picture component or the third picture component prediction is to be performed currently, in the video picture.

Assuming that the first picture component prediction is performed on the current block, and the first picture component is a luminance component, that is, the picture component to be predicted is a luminance component, then the current block may also be called a luminance block. Or assuming that the second picture component prediction is performed on the current block, and the second picture component is a chrominance component, that is, the picture component to be predicted is a chrominance component, then the current block may also be called a chrominance block.

It should also be noted that the prediction mode parameter indicates an encoding mode of the current block and a parameter related to the mode. The prediction mode parameter of the current block may be determined usually using rate distortion optimization (RDO).

Specifically, in some embodiments, in the implementation of the encoder determining the prediction mode parameter of the current block, the encoder determines an picture component to be predicted of the current block; predicts and encodes the picture component to be predicted using a plurality of prediction modes respectively based on a parameter of the current block, and calculates a rate distortion cost result corresponding to each of the plurality of prediction modes; and selects the minimum rate distortion cost result from a plurality of calculated rate distortion cost results, and determines a prediction mode corresponding to the minimum rate distortion cost result as the prediction mode parameter of the current block.

That is to say, for the current block, the picture component to be predicted may be encoded using the plurality of prediction modes respectively at the encoder side. Herein, the plurality of prediction modes usually include an inter prediction mode, a traditional intra prediction mode and a non-traditional intra prediction mode. The traditional intra prediction mode may further include a direct current (DC) mode, a PLANAR mode, an angle mode, etc. The non-traditional intra prediction mode may further include an MIP mode, a cross-component linear model prediction (CCLM) mode, an intra block copy (IBC) mode, a palette (PLT) mode, etc. The inter prediction mode may further include a geometrical partitioning for inter blocks (GEO) mode, a triangle partition mode (TPM), etc.

Therefore, after the current block is encoded using the plurality of prediction modes respectively, the rate distortion cost result corresponding to each of the plurality of prediction modes may be obtained; and then the minimum rate distortion cost result is selected from the plurality of obtained rate distortion cost results, and the prediction mode corresponding to the minimum rate distortion cost result is determined as the prediction mode parameter of the current block. Thus, the current block may be encoded finally using the determined prediction mode, and a prediction residual error can be small in this prediction mode, so as to improve the encoding efficiency.

In S102, a geometrical partitioning for inter blocks (GEO) parameter of the current block is determined when the prediction mode parameter indicates that a GEO mode is used for determining inter prediction of the current block.

In an embodiment of the present application, the GEO parameter of the current block may be acquired or determined when the prediction mode parameter indicates that a GEO mode is used for determining inter prediction of the current block. The current block in the embodiment of the present application refers to an inter block.

In the embodiment of the present application, the GEO parameter of the current block includes angle index information and size information of the current block, and may also include step size index information, and target partition mode, etc.

It should be noted that, in the embodiment of the present application, GEO is used for partitioning the inter block (i.e., the current block) into two non-rectangular sub-partitions, to predict respectively the two non-rectangular sub-partitions and then weight and integrate them for edge portions of an object in an picture. For example, the non-rectangular form may be shown in FIGS. 4A-4G below.

In the current VVC Draft7, there are 82 types of partition modes of GEO, each of which corresponds to an angle α and a step size ρ. There are 24 angles which are obtained by partitioning 360 degrees, and there are 4 step sizes. Thus, there are 96 combinations of the angles and the step sizes.

It should be noted that an angle table based on fixed step size is replaced with an angle table based on slope, and five fixed slopes (1, ½, ¼, 4, 2) are used to construct the angle table with unequal intervals.

Figure 5:
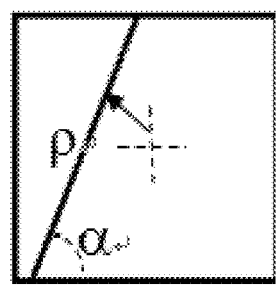
FIG. 5 is a schematic diagram of an angle and step size of an exemplary current block in accordance with an embodiment of the present application.

Illustratively, as shown in FIG. 5, each combination of the angle α and the step size ρ constitutes a partition mode (in which all the first step sizes with angle indices of 0, 6 and 12~23 are removed to obtain 82 partition modes), and all partition modes of GEO include a TPM, which is unified and replaced. The current block is partitioned into two non-rectangular sub-partitions in GEO, and unidirectional motion compensation is performed on each sub-partition separately to obtain unidirectional prediction values. Finally, the unidirectional prediction values of the two partitions are weighted and integrated using a weight matrix corresponding to the current block to obtain the final prediction value of GEO.

In the embodiment of the present application, at the encoder side, when it is determined that inter prediction is performed using GEO, the encoder may acquire the GEO parameter of the current block when inter prediction is performed using GEO.

In the embodiment of the present application, the encoder determines a partition mode in which the rate distortion cost is the lowest by traversing the 82 partition modes corresponding to GEO, that is, determines the target partition mode. The encoder may determine angle index information and step size index information corresponding to the target partition mode according to the target partition mode by a mapping table of preset partition modes, angle indices and step size indices. The mapping table of the preset partition modes, the angle indices and the step size indices is as shown in Table 1:

TABLE 1

| wedge_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 0 | 1 | 1 | 1 | 1 | 2 | 2 | 2 | 2 | 3 | 3 | 3 | 3 | 4 | 4 | 4 |
| distanceIdx | 1 | 2 | 3 | 0 | 1 | 2 | 3 | 0 | 1 | 2 | 3 | 0 | 1 | 2 | 3 | 0 | 1 | 2 |
| wedge_partition_idx | 18 | 19 | 20 | 21 | 22 | 23 | 24 | 25 | 26 | 27 | 28 | 29 | 30 | 31 | 32 | 33 | 34 | 35 |
| angleIdx | 4 | 5 | 5 | 5 | 5 | 6 | 6 | 6 | 7 | 7 | 7 | 7 | 8 | 8 | 8 | 8 | 9 | 9 |

TABLE 1-continued

| distanceIdx | 3 | 0 | 1 | 2 | 3 | 1 | 2 | 3 | 0 | 1 | 2 | 3 | 0 | 1 | 2 | 3 | 0 | 1 |
|---|---|---|---|---|---|---|---|---|---|---|---|---|---|---|---|---|---|---|
| wedge_partition_idx | 36 | 37 | 38 | 39 | 40 | 41 | 42 | 43 | 44 | 45 | 46 | 47 | 48 | 49 | 50 | 51 | 52 | 53 |
| angleIdx | 9 | 9 | 10 | 10 | 10 | 10 | 11 | 11 | 11 | 11 | 12 | 12 | 12 | 13 | 13 | 13 | 14 | 14 |
| distanceIdx | 2 | 3 | 0 | 1 | 2 | 3 | 0 | 1 | 2 | 3 | 1 | 2 | 3 | 1 | 2 | 3 | 1 | 2 |
| wedge_partition_idx | 54 | 55 | 56 | 57 | 58 | 59 | 60 | 61 | 62 | 63 | 64 | 65 | 66 | 67 | 68 | 69 | 70 | 71 |
| angleIdx | 14 | 15 | 15 | 15 | 16 | 16 | 16 | 17 | 17 | 17 | 18 | 18 | 18 | 19 | 19 | 19 | 20 | 20 |
| distanceIdx | 3 | 1 | 2 | 3 | 1 | 2 | 3 | 1 | 2 | 3 | 1 | 2 | 3 | 1 | 2 | 3 | 1 | 2 |
| wedge_partition_idx | 72 | 73 | 74 | 75 | 76 | 77 | 78 | 79 | 80 | 81 | | | | | | | | |
| angleIdx | 20 | 21 | 21 | 21 | 22 | 22 | 22 | 23 | 23 | 23 | | | | | | | | |
| distanceIdx | 3 | 1 | 2 | 3 | 1 | 2 | 3 | 1 | 2 | 3 | | | | | | | | |

Herein wedge_partition_idx is a partition mode index, angleIdx is the angle index information, and distanceIdx is the step size index information.

In S103, a first prediction value corresponding to a first partition of the current block and a second prediction value corresponding to a second partition of the current block are determined according to the GEO parameter.

In an embodiment of the present application, since the GEO parameter may include the angle index information and the target partition mode, the encoder may partition the current block according to the target partition mode to obtain the first partition and the second partition; and determine first motion information of a first reference block corresponding to the first partition and second motion information of a second reference block corresponding to the second partition from a preset merge candidate list. The encoder performs motion compensation according to the first motion information to obtain the first prediction value corresponding to the first partition, and the encoder performs motion compensation according to the second motion information to obtain the second prediction value corresponding to the second partition.

It should be noted that, in the embodiment of the present application, a unidirectional merge candidate list, i.e., the preset merge candidate list of TPMs in the original VVC7 is used in GEO, to find the respective MVs of the partitioned two partitions of GEO, i.e., motion information.

The merge candidate list generally includes a preset number of elements of a reference block, and the preset number may be 6. Each element stores data in a form of a structure, and each structure may include the motion information of the reference block, a reference frame list and a prediction direction, etc. When the data corresponding to GEO is stored, it is stored in a form of a block of 4×4.

In the embodiment of the present application, information such as the angle index information, the step size index information, the first motion information and the second motion information all need to be written into the bitstream to be used during decoding.

In S104, a weight index corresponding to the sample in the current block is determined according to the GEO parameter.

The GEO parameter includes the size information of the current block and the angle index information of the current block, and the size information is height and width of the current block. There are many samples in the current block. The encoder may determine position information of the sample in the current block according to the size information of the current block, and may calculate the weight index corresponding to each of the samples in the current block based on the position information, the angle index information and the updated angle mapping table of each of the samples in the current block.

The detailed acquisition process will be described in the subsequent examples.

In S105, the weight index corresponding to the sample in the current block is clipped respectively to obtain absolute information of the weight index corresponding to the sample in the current block, wherein the clipping is to clip the maximum value among absolute values of weight indices corresponding to samples in the current block to half of a preset numerical value.

After acquiring the samples in the current block, the encoder clips a result obtained from the absolute value of the weight index corresponding to the sample in the current block into a range of [0 to half of the preset numerical value], so as to obtain the absolute information of the weight index corresponding to each of the samples in the current block. When the absolute value of the weight index of a sample exceeds the half of the preset numerical value, the absolute information of the weight index corresponding to the sample is the half of the preset numerical value; when the absolute value of the weight index of the sample does not exceed the half of the preset numerical value, the absolute value of the weight index of the sample is the absolute information of its weight index.

In an embodiment of the present application, if the preset numerical value is 26, then the absolute information of the weight index is in a range of [0-13].

Illustratively, the absolute information of the weight index may be obtained through implementation of a ternary operator by expression (1), which is shown as follows:

$$\text{weightIdxAbs}=\text{Clip3}(0,13,\text{abs}(\text{weightIdx})) \quad (1)$$

wherein weightIdxAbs is absolute information of a weight index, weightIdx is a weight index, abs( ) is an absolute value function, and Clip3( ) is a clipping function.

In S106, a first weight value of the sample in the current block and a second weight value of the sample in the current block are determined based on the absolute information of the weight index corresponding to the sample in the current block.

After acquiring the absolute information of the weight index corresponding to the samples in the current block, the encoder may first determine weight value corresponding to the absolute information of the weight index according to the weight index corresponding to the sample in the current block and the absolute information of the weight index corresponding to the sample in the current block, then determine a weight value of a first sample of the first partition and a weight value of a second sample of the second partition from the samples in the current block based on the weight value corresponding to the absolute information of the weight index, then determine the first weight value of the sample in the current block corresponding to the first partition according to the weight value of the first sample in the first partition and the weight value of the second sample in the second partition, and finally determine the second weight value of the sample in the current block corresponding to the second partition according to the first weight value.

It should be noted that in the embodiment of the present application, when a weight index corresponding to one of the samples in the current block is less than or equal to 0, it is indicated that the sample belongs to the first partition; when a weight index corresponding to one of the samples in the current block is greater than 0, it is indicated that the sample belongs to the second partition. A process of obtaining the first weight value of the sample in the current block based on the first partition may be: obtaining absolute information of a first weight index corresponding to the first sample of the first partition and absolute information of a second weight index corresponding to the second sample of the second partition from the absolute information of the weight index corresponding to the sample in the current block; obtaining the weight value of the first sample according to the absolute information of the first weight index, and obtaining the weight value of the second sample according to the absolute information of the second weight index; and obtaining the first weight value of the sample in the current block corresponding to the first partition based on the weight value of the first sample and the weight value of the second sample. The second weight value of the sample in the current block is a value of subtracting the first weight value from 8.

In the embodiment of the present application, the specific implementation of the encoder determining the first weight value of the sample in the current block and the second weight value of the sample in the current block based on the absolute information of the weight index corresponding to the sample in the current block may include the following five ways.

The first way: When the absolute information of the weight index is less than a preset index threshold, the encoder performs right shift of the absolute information of the weight index combined with a first numerical value by preset binary digits, and then adds a preset weight numerical value to obtain the weight value corresponding to the absolute information of the weight index; when the absolute information of the weight index is greater than or equal to the preset index threshold, the encoder performs right shift of the absolute information of the weight index combined with a second numerical value by preset binary digits and then adds the preset weight numerical value to obtain the weight value corresponding to the absolute information of the weight index. The encoder determines the first weight value of the sample in the current block corresponding to the first partition according to the weight value corresponding to the absolute information of the weight index and the weight indices corresponding to the samples in the current block; and the encoder obtains the second weight value of the sample in the current block corresponding to the second partition according to the first weight value.

In the embodiment of the present application, since the absolute information of the weight indices is within the range of [0 to half of the preset numerical value], the encoder may first calculate the weight values corresponding to the absolute information of the weight indices within the range of [0 to half of the preset numerical value] according to the absolute information of the weight indices of the samples in the current block. Specifically, when the absolute information of the weight index is less than the preset index threshold, the encoder adds the first numerical value to the absolute information of the weight indices, then performs right shift of the obtained value by preset binary digits and then adds the preset weight numerical value to obtain the weight values corresponding to the absolute information of the weight indices; when the absolute information of the weight index is greater than or equal to the preset index threshold, the encoder performs right shift of the absolute information of the weight indices combined with the second numerical value by preset binary digits and then adds the preset weight numerical value to obtain the weight values corresponding to the absolute information of the weight indices.

Illustratively, a weight value corresponding to the absolute information of the weight indices may be obtained through implementation of a ternary operator by expression (2), which is shown as follows:

$$\text{WedgeFilter} = \text{weightIdxAbs} < 9 ? ((\text{weightIdxAbs} + 2) >> 2) + 4 : ((\text{weightIdxAbs} + 3) >> 2) + 4 \quad (2)$$

wherein the preset index threshold is 9; the first numerical value is 2; the second numerical value is 3; the preset weight numerical value is 4; the preset binary digits are 2, WedgeFilter is a weight value corresponding to weightIdxAbs, and weightIdxAbs is absolute information of one weight index.

It should be noted that the result of right shift in expression (2) only takes the integer part.

The weight values corresponding to the absolute information of the weight indices may be obtained using a piecewise mapping function by expression (3), which is shown as follows:

$$\text{WedgeFilter} = \begin{cases} \dfrac{(\text{WeightIdxAbs} + 2)}{4} + 4, & \text{WeightIdxAbs} < 9 \\ \dfrac{(\text{WeightIdxAbs} + 3)}{4} + 4, & \text{WeightIdxAbs} \geq 9 \end{cases} \quad (3)$$

wherein WedgeFilter is a weight value corresponding to weightIdxAbs, and weightIdxAbs is absolute information of one weight index.

When the preset numerical value is 26, the absolute information of the weight indices (weightIdxAbs) is 0, 1, 2, 3, 4, 5, 6, 7, 8, 9, 10, 11, 12 and 13, then the weight values (WedgeFilter[weightIdxAbs]) of the absolute information of the weight indices are calculated to be 4, 4, 5, 5, 5, 5, 6, 6, 6, 7, 7, 7, 7 and 8, respectively, according to expression (2) or (3).

It can be understood that when the encoder integrates a weight table lookup process into a GEO operation process using a piecewise function, it calculates directly and simply the corresponding weights through the weight indices of GEO, thereby omitting a weight mapping table and table lookup operation, and actually implementing implicitly lossless reduction of the weight table of GEO.

In the embodiment of the present application, the encoder obtains the absolute information of the first weight index corresponding to the first sample of the first partition and the absolute information of the second weight index corresponding to the second sample of the second partition according to the weight values corresponding to the absolute information of the weight indices and the weight indices corresponding to the samples in the current block; obtains the weight value of the first sample according to the absolute information of the first weight index, and obtains the weight value of the second sample according to the absolute information of the second weight index; and obtains the first weight value of the sample in the current block corresponding to the first partition based on the weight value of the first sample and the weight value of the second sample.

Illustratively, the first weight value of each sample may be obtained using expression (4), which is shown as follows:

$$sampleWeight = weightIdx <= 0 ? WedgeFilter : 8 - WedgeFilter \quad (4)$$

wherein sampleWeight is a weight value of a sample, weightIdx is a weight index of the sample, and WedgeFilter is a weight value corresponding to absolute weight information of the sample.

It can be seen from expression (4) that when the first weight values of the samples throughout the current block are obtained mainly based on the first partition, the weight values of the samples in the two partitions need to be determined based on the two partitions, so as to obtain the first weight values of the samples in the current block. The second weight values of the samples in the current block mainly based on the second partition are obtained by subtracting the first weight values of the samples in the current block from 8.

The second way: After the absolute information of the weight index is combined with a first numerical value and a value of whether the absolute information of the weight index is greater than 8, the encoder performs right shift by preset binary digits, and finally adds the preset weight numerical value to obtain the weight values corresponding to the absolute information of the weight indices. The encoder determines the first weight values of the samples in the current block corresponding to the first partition according to the weight values corresponding to the absolute information of the weight indices and the weight indices corresponding to the samples in the current block; and the encoder obtains the second weight values of the samples in the current block corresponding to the second partition according to the first weight values.

In the embodiment of the present application, since the absolute information of the weight indices is within the range of [0 to half of the preset numerical value], the encoder may first calculate the weight values corresponding to the absolute information of the weight indices within the range of [0 to half of the preset numerical value] according to the absolute information of the weight indices of the samples in the current block. Specifically, after the first numerical value and a value of whether the absolute information of the weight index is greater than 8 are added into the absolute information of the weight index, the encoder performs right shift by preset binary digits, and finally adds the preset weight numerical value to obtain the weight values corresponding to the absolute information of the weight indices.

Illustratively, the weight values corresponding to the absolute information of the weight indices may be obtained through implementation of a ternary operator by expression (5), which is shown as follows:

$$WedgeFilter = ((weightIdxAbs + 2 + (weightIdxAbs > 8)) >> 2) + 4 \quad (5)$$

wherein the first numerical value is 2; the preset weight numerical value is 4; the preset binary digits are 2, WedgeFilter is a weight value corresponding to weightIdxAbs, and weightIdxAbs is absolute information of a weight index.

It should be noted that the result of right shift in expression (3) only takes the integer part. When the absolute information of the weight index is greater than 8, the value is 1, and when the absolute information of the weight indices is less than or equal to 8, the value is 0.

When the preset numerical value is 26, the absolute information of the weight indices (weightIdxAbs) is 0, 1, 2, 3, 4, 5, 6, 7, 8, 9, 10, 11, 12 and 13, then the weight values (WedgeFilter[weightIdxAbs]) of the absolute information of the weight indices are calculated to be 4, 4, 5, 5, 5, 5, 6, 6, 6, 7, 7, 7, 7 and 8, respectively, according to expression (5).

It should be noted that the process in which the encoder determines the first weight values of the samples in the current block corresponding to the first partition according to the weight values corresponding to the absolute information of the weight indices and the weight indices corresponding to the samples in the current block and obtains the second weight values of the samples in the current block corresponding to the second partition according to the first weight values is consistent with the description of implementation of the first way, and will not be repeated herein.

The third way: After the absolute information of the weight indices is combined with a first numerical value and a value obtained after a sign operation is performed on a value of subtracting the absolute information of the weight index from 8, the encoder performs right shift by preset binary digits, and finally adds the preset weight numerical value to obtain the weight values corresponding to the absolute information of the weight indices; determines the first weight values of the samples in the current block corresponding to the first partition according to the weight values corresponding to the absolute information of the weight indices and the weight indices corresponding to the samples in the current block; and obtains the second weight values of the samples in the current block corresponding to the second partition according to the first weight values.

In the embodiment of the present application, since the absolute information of the weight indices is within the range of [0 to half of the preset numerical value], the encoder may first calculate the weight values corresponding to the absolute information of the weight indices within the range of [0 to half of the preset numerical value] according to the absolute information of the weight indices of the samples in the current block. Specifically, after the absolute information of the weight indices is combined with a first numerical value and a value obtained after a sign operation is performed on a value of subtracting the absolute information of the weight index from 8, the encoder performs right shift by preset binary digits, and finally adds the preset weight numerical value to obtain the weight values corresponding to the absolute information of the weight indices.

Illustratively, the weight values corresponding to the absolute information of the weight indices may be obtained through implementation of a ternary operator by expression (6), which is shown as follows:

$$WedgeFilter = ((weightIdxAbs + 2 + sign(8 - weightIdxAbs)) >> 2) + 4 \quad (6)$$

wherein the first numerical value is 2; the preset weight numerical value is 4; the preset binary digits are 2, WedgeFilter is a weight value corresponding to weightIdxAbs, and weightIdxAbs is absolute information of a weight index, and sign( ) is a sign function, when 8−weightIdxAbs<0, its value is 1, and when 8-weightIdxAbs is greater than or equal to 0, its value is 0.

When the preset numerical value is 26, the absolute information of the weight indices (weightIdxAbs) is 0, 1, 2, 3, 4, 5, 6, 7, 8, 9, 10, 11, 12 and 13, then the weight values (WedgeFilter[weightIdxAbs]) of the absolute information of the weight indices are calculated to be 4, 4, 5, 5, 5, 5, 6, 6, 6, 7, 7, 7, 7 and 8, respectively, according to expression (5).

It should be noted that the process in which the encoder determines the first weight values of the samples in the current block corresponding to the first partition according to the weight values corresponding to the absolute information of the weight indices and the weight indices corresponding to the samples in the current block and obtains the second weight values of the samples in the current block corresponding to the second partition according to the first weight values is consistent with the description of implementation of the first way, and will not be repeated herein.

Further, in order to achieve a calculation result similar to expression (6), the process may also be implemented using expression (7) or expression (8), which is not limited in the embodiment of the present application. Expression (7) and expression (8) are shown as follows:

$$WedgeFilter=((weightIdxAbs+2))>>2)+4 \quad (7)$$

$$WedgeFilter=((weightIdxAbs+1))>>2)+4 \quad (8)$$

The fourth way: The encoder obtains the weight values corresponding to the absolute information of the weight indices by looking up a preset weight mapping table according to the absolute information of the weight indices, wherein the preset weight mapping table is obtained by clipping respectively the weight indices corresponding to the samples in the current block into half of the preset numerical value. The encoder determines the first weight values of the samples in the current block corresponding to the first partition according to the weight values corresponding to the absolute information of the weight indices and the weight indices corresponding to the samples in the current block; and the encoder obtains the second weight values of the samples in the current block corresponding to the second partition according to the first weight values.

In the embodiment of the present application, the encoder may obtain the weight values of the absolute information of the weight indices from 0 to half of the preset numerical value as the preset weight mapping table based on any one of the first way through the third way. When the encoder obtains the absolute information of the weight indices of the samples in the current block, it may find out the weight values corresponding to the samples from the preset weight mapping table.

Illustratively, the preset weight mapping table is as shown in Table 2.

TABLE 2

| weightIdxAbs | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| WedgeFilter | 4 | 4 | 5 | 5 | 5 | 5 | 6 | 6 | 6 | 7 | 7 | 7 | 7 | 8 |

It should be noted that the process in which the encoder determines the first weight values of the samples in the current block corresponding to the first partition according to the weight values corresponding to the absolute information of the weight indices and the weight indices corresponding to the samples in the current block and obtains the second weight values of the samples in the current block corresponding to the second partition according to the first weight values is consistent with the description of implementation of the first way, and will not be repeated herein.

The fifth way: When the absolute information of the weight index is less than the preset index threshold, the encoder performs right shift of the absolute information of the weight indices combined with the first numerical value by preset binary digits to obtain new weight indices; when the absolute information of the weight index is greater than or equal to the preset index threshold, the encoder performs right shift of the absolute information of the weight indices combined with the second numerical value by preset binary digits to obtain new weight indices. The encoder acquires new weight values corresponding to the new weight indices from the preset new weight mapping table. When the information of the weight index is less than or equal to 0, the encoder determines the new weight value as the weight value corresponding to the absolute information of the weight index; when the information of the weight index is greater than 0, the encoder determines a value of subtracting the new weight value from as the weight value corresponding to the absolute information of the weight index. The encoder determines the first weight values of the samples in the current block corresponding to the first partition according to the weight values corresponding to the absolute information of the weight indices and the weight indices corresponding to the samples in the current block; and the encoder obtains the second weight values of the samples in the current block corresponding to the second partition according to the first weight values.

In the embodiment of the present application, a preset new weight mapping table is provided to represent a corresponding relationship between the weight values and the information of the weight indices, wherein there is no duplicate values among the weight values, the information of the weight indices belongs to [0 to half of the preset numerical value], and the amount of the specific information of the weight indices is consistent with the number of the weight values, as shown in Table 3.

TABLE 3

| ReduceIdx | 0 | 1 | 2 | 3 | 4 |
|---|---|---|---|---|---|
| WedgeFilter [ReduceIdx] | 4 | 5 | 6 | 7 | 8 | wherein ReduceIdx is information of a weight index, and WedgeFilter[ReduceIdx] is a weight value.

When the encoder obtains the absolute information of the weight indices of the samples in the current block, when the absolute information of the weight index is less than the preset index threshold, the encoder performs right shift of the absolute information of the weight indices combined with the first numerical value by the preset binary digits to obtain the new weight indices; when the absolute information of the weight index is greater than or equal to the preset index threshold, the encoder performs right shift of the absolute information of the weight indices combined with the second numerical value by the preset binary digits to obtain the new weight indices.

Illustratively, the new weight indices may be obtained through implementation of a ternary operator by expression (9), which is shown as follows:

$$ReduceIdx=WeightIdxabs<9?((WeightIdxabs+2)>>2): ((WeightIdxabs+3)>>2) \quad (9)$$

wherein ReduceIdx is a new weight index, WeightIdxabs is absolute information of a weight index of a sample, and the preset index threshold is 9; the first numerical value is 2; the second numerical value is 3; the preset weight numerical value is 4; and the preset binary digits are 2.

It should be noted that the result of right shift in expression (9) only takes the integer part.

The new weight indices may also be obtained using a piecewise mapping function by expression (10), which is shown as follows:

$$ReduceIdx = \begin{cases} \dfrac{(WeightIdxAbs+2)}{4}, & WeightIdxAbs < 9 \\ \dfrac{(WeightIdxAbs+3)}{4}, & WeightIdxAbs \geq 9 \end{cases} \quad (10)$$

In the embodiment of the present application, the encoder may obtain the weight value corresponding to the absolute information of the weight index, i.e., the new weight value WedgeFilter[ReduceIdx] corresponding to the new weight index, of each of the samples in the current block from the preset new weight mapping table. When the information of the weight index of each of the samples is less than or equal to 0, the encoder determines the new weight value as the weight value corresponding to the absolute information of the weight index; when the information of the weight index is greater than 0, the encoder determines a value of subtracting the new weight value from as the weight value corresponding to the absolute information of the weight index.

In the embodiment of the present application, the encoder obtains the absolute information of the first weight index corresponding to the first sample of the first partition and the absolute information of the second weight index corresponding to the second sample of the second partition according to the weight values corresponding to the absolute information of the weight indices and the weight indices corresponding to the samples in the current block; obtains the weight value of the first sample according to the absolute information of the first weight index, and obtains the weight value of the second sample according to the absolute information of the second weight index; and obtains the first weight values of the samples in the current block corresponding to the first partition based on the weight value of the first sample and the weight value of the second sample.

Illustratively, the first weight value of each sample may be obtained by expression (11), which is shown as follows:

sampleWeight=weightIdx<=0?WedgeFilter[ReduceIdx]:8−WedgeFilter[ReduceIdx]    (11)

wherein sampleWeight is a weight value of a sample, weightIdx is a weight index of the sample, and WedgeFilter[ReduceIdx] is a new weight value corresponding to absolute information of a weight of the sample.

It can be understood that the encoder simplifies the weight mapping table of GEO, and deduces weights of GEO during operation using feasible mathematical formulas, so as to implement implicitly reduction of the original weight mapping table while omitting the weight mapping table and table lookup operation, such that codes and texts can be further simplified, and the storage overhead of the weight mapping table is decreased as well.

In S107, weighted combination is performed using the first prediction value, the first weight value, the second prediction value and the second weight value to obtain an inter prediction of the sample of the current block.

In the embodiment of the present application, the encoder may complete the weighted combination by multiplying the first prediction value by the first weight value of each sample and adding a product of the second prediction value and the second weight value of each sample, to obtain the inter prediction of the sample of the current block.

It should be noted that the first prediction value and the second prediction value are two prediction values corresponding to each of the samples in the current block, and the first weight value and the second weight value are two different weight values respectively corresponding to each of the samples in the current block.

The inter prediction value of the current block may be obtained using expression (23), which is shown as follows:

pbSamples[x][y]=Clip3(0,(1<<bitDepth)−1,(predSamplesLPART1[x][y]*(8−sampleWeight1)+predSamplesLPART2[x][y]*sampleWeight2+offset1)
>>shift1)    (23)

wherein pbSamples[x][y] is an inter prediction value of each sample in the current block, predSamplesLPART1[x][y] is a first prediction value of each sample, sampleWeight1 is a first weight value of each sample, predSamplesLPART2[x][y] is a second prediction value of each sample, and sampleWeight2 is a second weight value of each sample.

In some embodiments of the present application, when the encoder performs inter prediction of the current block, the encoder predicts video components separately, that is, both the first prediction value and the second prediction value include a luminance prediction value and a chrominance prediction value.

In the embodiment of the present application, the encoder may first acquire weight values of a luminance component, and may obtain weight values of a chrominance component according to the weight values of the luminance component.

The first and second weight values mentioned above in the present application may be the weight values of the luminance component.

It should be noted that the encoder downsamples weights of a luminance sample by directly taking the weights of the luminance sample in the upper right corner of each block of 2*2 as weights of a chrominance sample in the current position (x, y).

Illustratively, a first weight of luminance as shown in FIG. 6A is downsampled to obtain a first weight value of chrominance as shown in FIG. 6B. Similarly, after a second weight of luminance is downsampled, a second weight of the luminance sample in the upper right corner of each block of 2*2 is directly used as a second weight of the chrominance sample in the current position (x, y).

It can be understood that during inter prediction, the encoder may determine the weight index corresponding to the sample in the current block according to the GEO parameter, and then clip the maximum value among the absolute values of weight indices corresponding to samples in the current block to half of the preset numerical value through clipping processing of the absolute values, such that the size of the original clipping to half of the preset numerical value is reduced, thus the storage and use of the weight values corresponding to the absolute information of half of the weight indices are reduced, further simplifying texts and codes during inter prediction and decreasing the storage overhead of data.

In some embodiments of the present application, as shown in FIG. 7, the GEO parameter of the current block includes angle index information and size information of the current block. Implementation of S104 in the inter prediction method in accordance with the embodiment of the present application may include the following acts S1041-S1042.

In S1041, position information of the sample in the current block is determined according to the size information of the current block.

In S1042, the weight index corresponding to the sample in the current block is determined in combination with the position information of the sample in the current block respectively according to the angle index information and a preset angle mapping table.

In the embodiment of the present application, the size information of the current block of the encoder includes height H of the current block and width W of the current block, so that a coordinate area where the current block is located may be determined, and then the position information of each of the samples in the current block, that is, coordinate information (x, y) of each of the samples may be determined. The encoder may determine the weight index corresponding to the sample in the current block according to the angle index information, the preset angle mapping table and the position information of the sample in the current block.

In some embodiments of the present application, in the implementation process in which the encoder may determine the weight index corresponding to the sample in the current block according to the angle index information, the preset angle mapping table and the position information of the sample in the current block, the encoder determines cosine angle index information and sine angle index information according to the angle index information; the encoder descends powers of angles in the preset angle mapping table to obtain an updated angle mapping table; the encoder determines the weight index corresponding to the sample in the current block in combination with the position information of the sample in the current block respectively according to the cosine angle index information, the sine angle index information and the updated angle mapping table.

It should be noted that the preset angle mapping table is an angle mapping table used in the prior art, as shown in Table 4:

TABLE 4

| angleIdx | 0 | 1 | 2 | 3 | 4 | 5 | 6 | 7 | 8 | 9 | 10 | 11 |
|---|---|---|---|---|---|---|---|---|---|---|---|---|
| Dis[angleIdx] | 8 | 8 | 8 | 8 | 4 | 2 | 0 | −2 | −4 | −8 | −8 | −8 |
| angleIdx | 12 | 13 | 14 | 15 | 16 | 17 | 18 | 19 | 20 | 21 | 22 | 23 |
| Dis[angleIdx] | −8 | −8 | −8 | −8 | −4 | −2 | 0 | 2 | 4 | 8 | 8 | 8 | wherein angleIdx is angle index information and Dis[angleIdx] is an angle.

In the embodiment of the present application, the encoder descends the powers of the angles in the preset angle mapping table to obtain angles in the updated angle mapping table, the powers of which are descended by one order relative to the angles in the preset angle mapping table, as shown in Table 5.

TABLE 5

| angleIdx | 0 | 1 | 2 | 3 | 4 | 5 | 6 | 7 | 8 | 9 | 10 | 11 |
|---|---|---|---|---|---|---|---|---|---|---|---|---|
| Dis[angleIdx] | 4 | 4 | 4 | 4 | 2 | 1 | 0 | −1 | −2 | −4 | −4 | −4 |
| angleIdx | 12 | 13 | 14 | 15 | 16 | 17 | 18 | 19 | 20 | 21 | 22 | 23 |
| Dis[angleIdx] | −4 | −4 | −4 | −4 | −2 | −1 | 0 | 1 | 2 | 4 | 4 | 4 | wherein the encoder deletes the original preset angle mapping table and keeps only the updated angle mapping table, such that the storage overhead can be reduced.

In the embodiment of the present application, in the implementation process in which the encoder determines the weight index corresponding to the sample in the current block according to the cosine angle index information, the sine angle index information and the updated angle mapping table in combination with the position information of the sample in the current block respectively, the encoder needs to first determine a vertical distance rho from a center point of the block to a current partitioning line according to the cosine angle index information and the sine angle index information, and then determines the weight index corresponding to each sample according to the cosine angle index information, the sine angle index information, the updated angle mapping table, the position information of the sample in the current block and rho.

Illustratively, the cosine angle index information may be obtained according to expression (12), and the sine angle index information may be obtained according to expression (13). Expressions (12) and (13) are shown as follows:

$$\text{displacementX} = \text{angleIdx} \tag{12}$$

$$\text{displacementY} = (\text{displacementX} + 6)\%24 \tag{13}$$

wherein displacementX is cosine angle index information and displacementY is sine angle index information; and angleIdx is angle index information.

It should be noted that an index number of $\cos(\alpha)$ corresponding to the current angle is displacementX, and an index number of $-\sin(\alpha)$ corresponding to the current angle is DisplacementY.

Rho may be obtained according to expression (14), which is shown as follows:

$$\text{rho} = (\text{Dis}[\text{displacementX}] << 8) + (\text{Dis}[\text{displacementY}] << 8) \tag{14}$$

wherein Dis [displacementX] is a cosine angle (first angle) corresponding to the cosine angle index information, and Dis[displacementY] is a sine angle (second angle) corresponding to the sine angle index information, wherein the cosine angle and sine angle may be obtained according to the updated mapping table.

The weight index of each sample in the current block may be obtained by expression (15), which is shown as follows:

$$\text{weightIdx} = ((x<<1)+1)*\text{Dis}[\text{displacementX}] + ((y<<1)+1))*\text{Dis}[\text{displacementY}] - \text{rho} \tag{15}$$

wherein weightIdx is a weight index of a sample, x is an abscissa value of the sample, and y is an ordinate value of the sample. Position information of the sample is (x, y).

It can be understood that the corresponding weights are obtained by looking up the weight mapping table through the obtained indices, it can be found that angles Dis[displacementX] and Dis[displacementY] need to be multiplied in each of above steps of calculation, while in the present scheme, the weight mapping table is removed and a mathematical approach is designed to implicitly reduce the weight mapping table by half. Therefore, the weight indices and motion indices need to be divided by 2 in each step of calculating the weight indices and motion indices. However, since values in the angle mapping table are all powers of 2, the operation in which the weight indices and motion indices are divided by 2 can be implemented by descending the power of the angle mapping table, which corresponds to the reduced weight mapping table.

In some embodiments of the present application, after S107 of the inter prediction method in accordance with the embodiment of the present application, the method may further include the following acts S108-S113.

In S108, a motion offset value is determined according to the cosine angle index information, the sine angle index information and the updated angle mapping table, and a motion abscissa offset value and a motion ordinate offset value corresponding to the current block are obtained according to the angle index information, the step size index information and the size information of the current block.

In S109, motion index information is obtained according to the motion offset value, the motion abscissa offset value, the motion ordinate offset value, the position information of the sample in the upper left corner of the current block, a first angle corresponding to the cosine angle index information and a second angle corresponding to the sine angle index information.

In S110, when an absolute value of the motion index information is less than half of a preset motion index threshold, the first motion information and the second motion information are determined as motion information of the current block.

In S111, when the motion index information is less than or equal to 0, the first motion information is determined as the motion information of the current block.

In S112, when the motion index information is greater than 0, the second motion information is determined as the motion information of the current block.

In S113, the motion information of the current block is stored in a preset merge candidate list.

In the embodiment of the present application, when the encoder encodes the current block, the encoded motion information of the current block also needs to be stored for use for inter prediction of subsequent coding blocks. The encoder calculates the first angle and the second angle according to the cosine angle index information, the sine angle index information and the updated angle mapping table, and then obtains the motion offset value based on the first angle and the second angle. The encoder obtains the motion index information according to the motion offset value, the motion abscissa offset value, the motion ordinate offset value, the position information of the sample in the upper left corner of the current block, the first angle corresponding to the cosine angle index information and the second angle corresponding to the sine angle index information. When the absolute value of the motion index information is less than half of the preset motion index threshold, the encoder determines the first motion information and the second motion information as the motion information of the current block. When the motion index information is less than or equal to 0, the encoder determines the first motion information as the motion information of the current block; when the motion index information is greater than 0, the encoder determines the second motion information as the motion information of the current block. The motion information of the current block is stored in the preset merge candidate list.

Illustratively, the motion offset value motionOffset may be obtained using expression (16), which is shown as follows:

$$\text{motionOffset}=3*\text{Dis}[\text{displacement}X]+3*\text{Dis}[\text{displacement}Y] \quad (16)$$

In the embodiment of the present application, since the GEO parameter also includes the step size index information, the encoder may obtain the motion abscissa offset value and the motion ordinate offset value corresponding to the current block according to the angle index information, the step size index information and the size information of the current block. When shiftHor==0, this process may be implemented using expressions (17) and (18), which are shown as follows:

$$\text{offset}X=(64-\text{num}SbX)\!>\!>\!1 \quad (17)$$

$$\text{offset}Y=(64-\text{num}SbY)\!>\!>\!1+\text{angleIdx}<12? \\ (\text{distanceIdx}*nCbH)\!>\!>\!3\!:\!-((\text{distanceIdx}* \\ nCbH)\!>\!>\!3) \quad (18)$$

wherein offsetX is a motion abscissa offset value, offsetY is a motion ordinate offset value, angleIdx is angle index information, distanceIdx is step size index information, numSbX is width of a motion mask matrix of the current block, numSbY is height of the motion mask matrix of the current block, and nCbW and nCbH represent the width and height of the current block.

In the embodiment of the present application, since the GEO parameter also includes the step size index information, the encoder may obtain the motion abscissa offset value and the motion ordinate offset value corresponding to the current block according to the angle index information, the step size index information and the size information of the current block. When the shiftHor==1, this process may be implemented using expressions (19) and (20), which are shown as follows:

$$\text{offset}X=(64-\text{num}SbX)\!>\!>\!1+\text{angleIdx}<12? \\ (\text{distanceIdx}*nCbW)\!>\!>\!3\!:\!-((\text{distanceIdx}* \\ nCbW)\!>\!>\!3) \quad (19)$$

$$\text{offset}Y=(64-\text{num}SbY)\!>\!>\!1 \quad (20)$$

wherein offsetX is a motion abscissa offset value, offsetY is a motion ordinate offset value, angleIdx is angle index information, distanceIdx is step size index information, numSbX is width of a motion mask matrix of the current block, numSbY is height of the motion mask matrix of the current block, and nCbW and nCbH represent width and height of the current block.

Illustratively, in the embodiment of the present application, the process in which the encoder obtains the motion index information according to the motion offset value, the motion abscissa offset value, the motion ordinate offset value, the position information of the sample in the upper left corner of the current block, the first angle corresponding to the cosine angle index information, and the second angle corresponding to the sine angle index information may be implemented by expression (21), which is shown as follows:

$$\text{motionIdx}=(((x\text{SbIdx}+\text{offset}X)\!<\!<\!3)+1)*\text{Dis}[\text{displacement}X]+(((y\text{SbIdx}+\text{offset}Y)\!<\!<\!3)+1))*\text{Dis}[\text{displacement}Y]-\text{rho}+\text{motionOffset} \quad (21)$$

wherein motionIdx is motion offset information, (xSbIdx, ySbIdx) is position information of the sample in the upper left corner of the current block, offsetX is a motion abscissa offset value, offsetY is a motion ordinate offset value, Dis[displacementX] is a first angle, Dis[displacementY] is a second angle, rho is a vertical distance from a center point of the block to a current partitioning line obtained according to the first angle and the second angle, and motionOffset is a motion offset value.

It should be noted that ShiftHor is a horizontal offset with a value of 0, and a plurality of offsets with a value of 1 are needed on the Y axis and a plurality of offsets are needed on the X axis.

If (angleIdx % 12==6)||(angleIdx % 12!=0 && hwRatio≥1), ShiftHor=0; otherwise, ShiftHor=1.

In some embodiments of the present application, the encoder may determine the motion information of the current block from the first motion information and the second motion information according to the current motion mask matrix and store it in the preset merge candidate list.

In some embodiments of the present application, the encoder may also determine the motion information of the current block based on the motion index information. The first motion information and the second motion information are determined as the motion information of the current block when the absolute value of the motion index information is less than half of the preset motion index threshold; and the first motion information is determined as the motion information of the current block when the motion index information is less than or equal to 0; the second motion information is determined as the motion information of the current block when the motion index information is greater than 0. The motion information of the current block is stored in the preset merge candidate list.

Assuming that the current block has the size of 16×16, the encoder may determine whether the current sub-block is unidirectional or bidirectional based on the size of abs (motionIdx) at each sub-block of 4×4.

Illustratively, if abs(motionIdx)<16, the current block stores the constructed bidirectional motion information, that is, the first motion information and the second motion information.

If (motionIdx)<=0, the current block stores the first motion information of the first partition.

If (motionIdx)>0, the current block stores the second motion information of the second partition.

The preset motion index threshold is 32.

It should be noted that in the embodiment of the present application, the encoder may first acquire the motion mask matrix, and then obtain the current motion mask matrix of the current block according to the motion abscissa offset value and the motion ordinate offset value by clipping the preset motion mask matrix.

Figure 8:
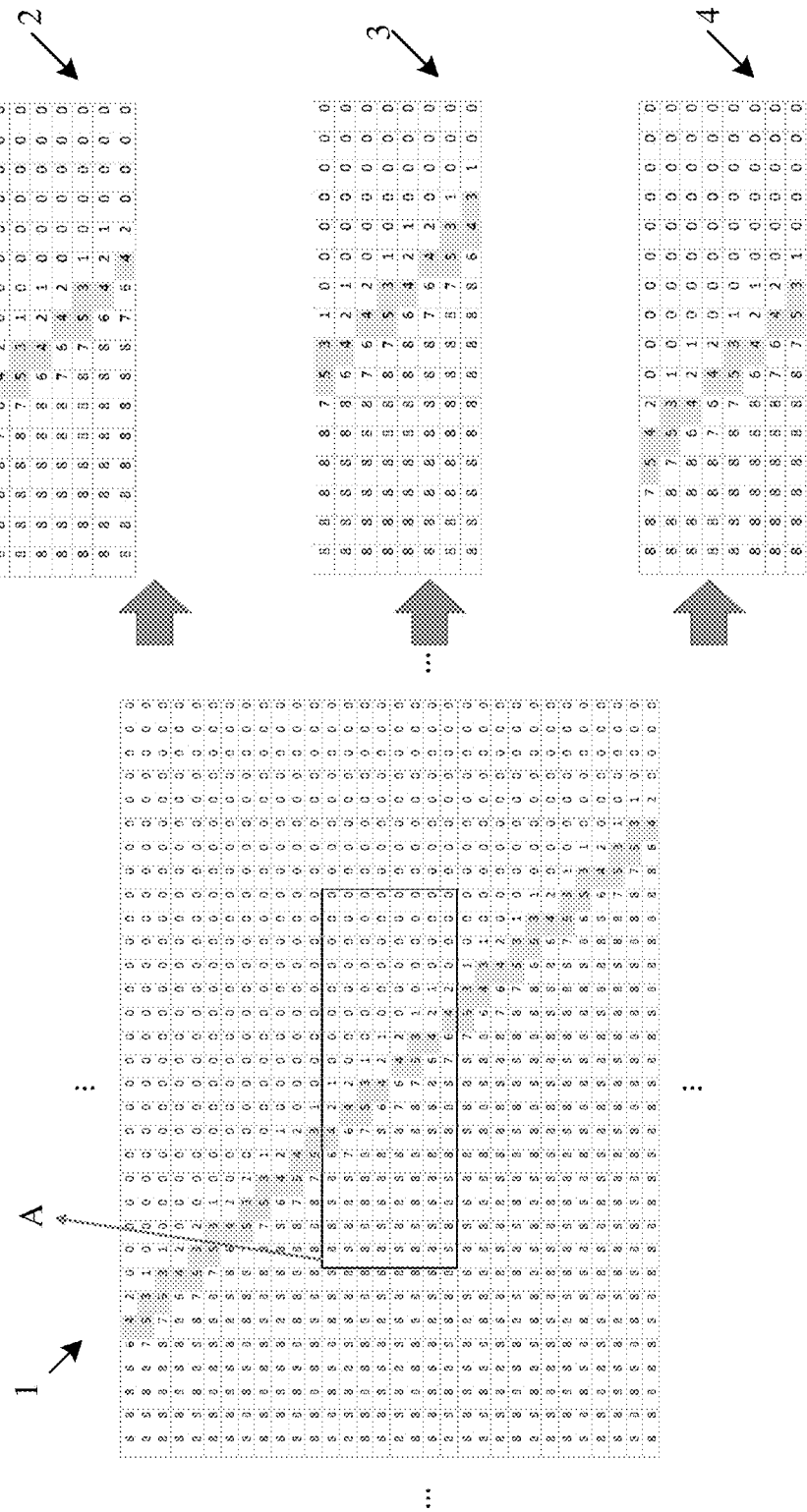
FIG. 8 is a schematic diagram of an exemplary preset motion mask matrix 1 and current motion mask matrices 2, 3 and 4 in accordance with an embodiment of the present application.

Illustratively, the preset motion mask matrix 1 as shown in FIG. 8 may be clipped using the size A of the current block based on different partition modes, different angles Y, step sizes p, offsetX and offsetY to form different current motion mask matrices 2, 3 and 4.

It should be noted that since GEO inherits TPM's way of storing the motion information, the motion information in a GEO mode is still stored by taking a block of 4×4 as a unit, so the size of the pre-defined motion mask matrix of GEO is 56×56, and the motion information of each block of 4×4 is determined by a weighted weight at a point of its upper left corner. Finally, the calculated motion masks of all blocks of 4×4 are stored into the matrix of 56×56. Specifically, the encoder obtains the motion offset value motionOffset by expression (16), and obtains all the motion index information motionIdx1 according to the position information (x, y) of each sample in the matrix of 56×56, motionoffset, rho, the first angle and the second angle, as shown in expression (22):

$$motionIdx1=((x<<3)+1)*Dis[displacementX]+ ((y<<3+1))*Dis[displacementY]-rho+motion-Offset \quad (22)$$

wherein a mask corresponding to the motion information in the preset motion mask matrix of 56×56 is determined based on abs(motionIdx1) and motionIdx1.

Illustratively, if abs(motionIdx)<16, a motion mask of the current sub-block of 4×4 is 2 (representing the bidirectional motion information); otherwise, if (motionIdx)<=0, the motion mask of the current sub-block of 4×4 is 0 (representing the first motion information); if (motionIdx)>0, the motion mask of the current sub-block 4×4 is 1 (representing the second motion information).

It should be noted that in the embodiment of the present application, there are actually seven pre-stored mask matrices (including weighted weight mask matrices and motion mask matrices), which respectively correspond to cases that first step sizes of seven angles between 0 and 90 degree passes the center point of the block. The pre-stored mask matrices of the remaining angles are obtained by mirroring these seven matrices in the horizontal or vertical direction, so as to reduce the storage space.

It can be understood that after the inter prediction method in accordance with the embodiment of the present application is implemented on GEO-based VVC reference software VTM7.0_common_base, a test sequence required for JVET is tested under the condition of random access, and there is no change of BD-rate in Y, Cb and Cr components (consistent with the Anchor performance). This data shows that this simplified scheme will not have any influence on the encoding performance, and decrease the storage of the weight table and simplify text description and implementation of codes. In terms of time complexity, because the predefined weight matrix of GEO is calculated only once for each sequence before the start of encoding and decoding, the operation of a ternary operator brought by the present scheme will not affect the overall encoding and decoding time complexity, that is to say, the time complexity remains basically unchanged.

An embodiment of the present application provides an inter prediction method, which is applied to a video decoding device, i.e., a decoder. Functions implemented by the method may be implemented by a processor in the video decoding device by invoking program codes. Of course, the program codes may be stored in a computer storage medium. It is thus seen that the video decoding device at least includes a processor and a storage medium.

Figure 9:
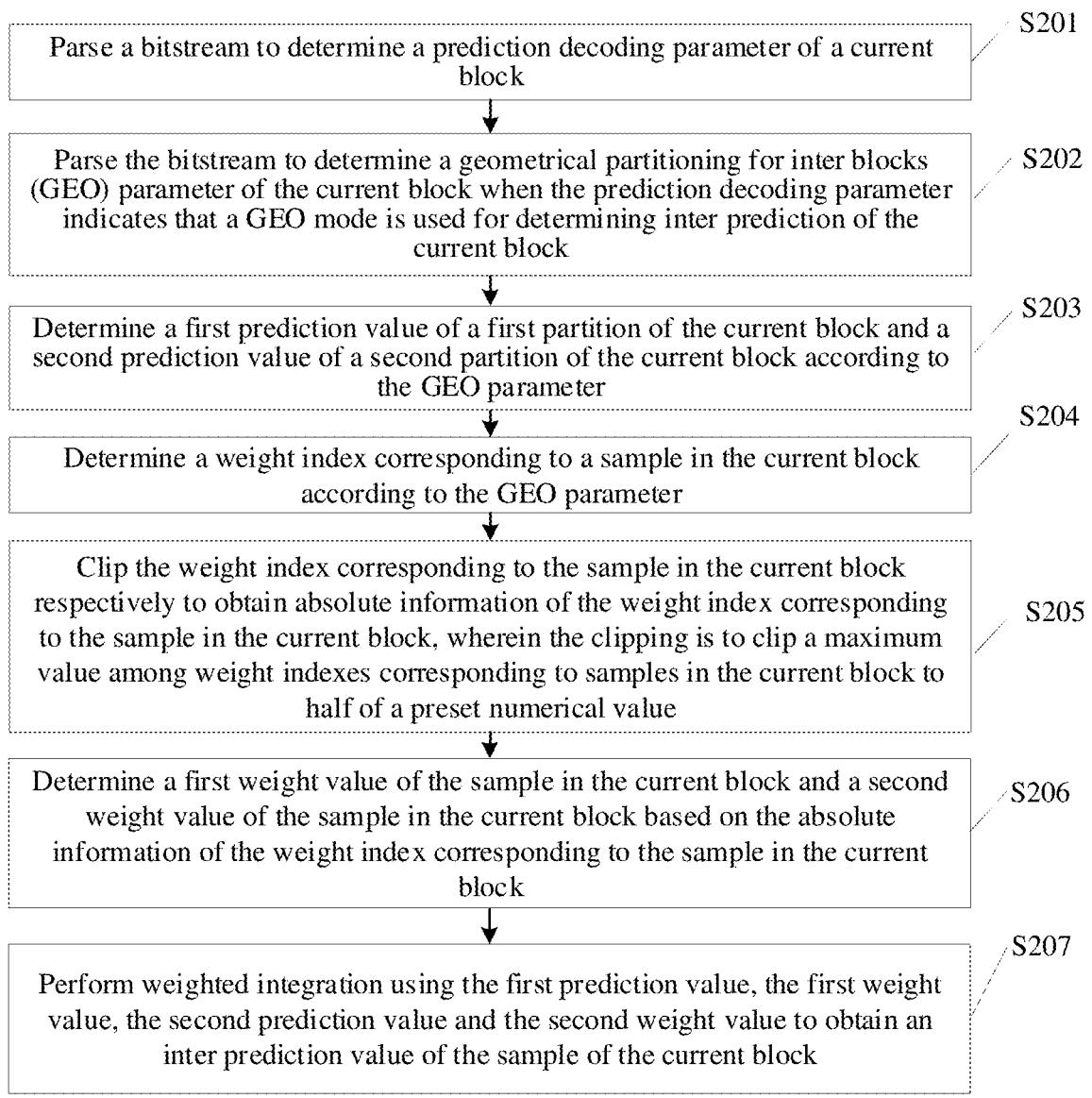
FIG. 9 is a schematic flowchart of an implementation of an intra detection method further in accordance with an embodiment of the present application.

FIG. 9 is a schematic flowchart of an implementation of an intra prediction method in accordance with an embodiment of the present application. As shown in FIG. 9, the method includes the following acts S201-S207.

In S201, a bitstream is parsed and a prediction mode parameter of a current block is determined.

In S202, the bitstream is parsed and a geometrical partitioning for inter blocks (GEO) parameter of the current block is determined when the prediction mode parameter indicates that a GEO mode is used for determining inter prediction of the current block.

In S203, a first prediction value corresponding to a first partition of the current block and a second prediction value corresponding to a second partition of the current block are determined according to the GEO parameter.

In S204, a weight index corresponding to the sample in the current block is determined according to the GEO parameter.

In S205, the weight index corresponding to the sample in the current block is clipped respectively to obtain absolute information of the weight index corresponding to the sample in the current block, wherein the clipping is to clip the maximum value among weight indices corresponding to samples in the current block to half of a preset numerical value.

In S206, the first weight value of the sample in the current block and the second weight value of the sample in the current block are determined based on the absolute information of the weight index corresponding to the sample in the current block.

In S207, weighted combination is performed using the first prediction value, the first weight value, the second prediction value and the second weight value to obtain an inter prediction of the sample of the current block.

In some embodiments of the present application, the specific implementation in which the decoder determines the first weight value and the second weight value of the sample in the current block based on the absolute information of the weight index corresponding to the sample in the current block may include the following five ways.

The first way: When the absolute information of the weight index is less than a preset index threshold, the decoder performs right shift of the absolute information of the weight indices combined with a first numerical value by the preset binary digits, and then adds a preset weight numerical value to obtain weight values corresponding to the absolute information of the weight indices; when the absolute information of the weight index is greater than or equal to the preset index threshold, the decoder performs right shift of the absolute information of the weight indices combined with a second numerical value by the preset binary digits and then adds the preset weight numerical value to obtain the weight values corresponding to the absolute information of the weight indices. The decoder determines the first weight values of the samples in the current block corresponding to the first partition according to the weight values corresponding to the absolute information of the weight indices and the weight indices corresponding to the samples in the current block; and the decoder obtains the second weight values of the samples in the current block corresponding to the second partition according to the first weight values.

The second way: After the absolute information of the weight index is combined with a first numerical value and a value of whether the absolute information of the weight index is greater than 8, the decoder performs right shift by the preset binary digits, and finally adds the preset weight numerical value to obtain the weight values corresponding to the absolute information of the weight indices. The decoder determines the first weight values of the samples in the current block corresponding to the first partition according to the weight values corresponding to the absolute information of the weight indices and the weight indices corresponding to the samples in the current block; and the decoder obtains the second weight values of the samples in the current block corresponding to the second partition according to the first weight values.

The third way: After the absolute information of the weight indices, is combined with a first numerical value and a value obtained after a sign operation is performed on a value of subtracting the absolute information of the weight index from 8, the decoder performs right shift by the preset binary digits, and finally adds the preset weight numerical value to obtain the weight values corresponding to the absolute information of the weight indices; determines the first weight values of the samples in the current block corresponding to the first partition according to the weight values corresponding to the absolute information of the weight indices and the weight indices corresponding to the samples in the current block; and obtains the second weight values of the samples in the current block corresponding to the second partition according to the first weight values.

The fourth way: The decoder obtains the weight values corresponding to the absolute information of the weight indices by looking up a preset weight mapping table according to the absolute information of the weight indices, wherein the preset weight mapping table is obtained by clipping respectively the weight indices corresponding to the samples in the current block into half of the preset numerical value. The decoder determines the first weight values of the samples in the current block corresponding to the first partition according to the weight values corresponding to the absolute information of the weight indices and the weight indices corresponding to the samples in the current block; and the decoder obtains the second weight values of the samples in the current block corresponding to the second partition according to the first weight values.

The fifth way: When the absolute information of the weight index is less than the preset index threshold, the decoder performs right shift of the absolute information of the weight indices combined with the first numerical value by the preset binary digits to obtain new weight indices; when the absolute information of the weight index is greater than or equal to the preset index threshold, the decoder performs right shift of the absolute information of the weight indices combined with the second numerical value by the preset binary digits to obtain new weight indices. The decoder acquires new weight values corresponding to the new weight indices from the preset new weight mapping table. When the information of the weight index is less than or equal to 0, the decoder determines the new weight value as the weight value corresponding to the absolute information of the weight index; when the information of the weight index is greater than 0, the decoder determines a value of subtracting the new weight value from as the weight value corresponding to the absolute information of the weight index. The decoder determines the first weight values of the samples in the current block corresponding to the first partition according to the weight values corresponding to the absolute information of the weight indices and the weight indices corresponding to the samples in the current block; and the decoder obtains the second weight values of the samples in the current block corresponding to the second partition according to the first weight values.

In the embodiment of the present application, the decoder parses angle index information corresponding to the current block, first motion information of a first reference block corresponding to the first partition, second motion information of a second reference block corresponding to the second partition and step size index information from the bitstream; and performs motion compensation according to the first motion information and the second motion information respectively to obtain a first unidirectional prediction value corresponding to the first partition and a second unidirectional prediction value corresponding to the second partition.

The preset numerical value is 26; the preset index threshold is 9; the first numerical value is 2; the second numerical value is 3; the preset weight numerical value is 4; and the preset binary digits are 2.

In the embodiment of the present application, implementation of S201-S207 of the decoder is basically consistent with the process of implementing S101-S107 at the encoder side, and will not be repeated herein.

The difference is that both predictive decoding parameter and the GEO parameter of the current block at the decoder side are parsed from the bitstream, while the encoder acquires them by itself.

It can be understood that during inter prediction, the decoder may determine the weight index corresponding to the sample in the current block according to the GEO parameter, and then clip the maximum value among the absolute values of weight indices corresponding to samples in the current block to half of the preset numerical value through clipping processing of the absolute values, such that the size of the original clipping to half of the preset numerical value is reduced, thus the storage and use of the weight values corresponding to the absolute information of half of the weight indices are reduced, further simplifying texts and codes during inter prediction, and decreasing the storage overhead of data.

In some embodiments of the present application, the GEO parameter of the current block includes angle index information and size information of the current block. Implementation of S204 in the Inter prediction method in accordance with the embodiment of the present application may include the following acts S2041-S2042.

In S2041, position information of the sample in the current block is determined according to the size information of the current block.

In S2042, the weight index corresponding to the sample in the current block is determined in combination with the position information of the sample in the current block respectively according to the angle index information and a preset angle mapping table.

In some embodiments of the present application, the decoder may determine cosine angle index information and sine angle index information according to the angle index information; descend powers of angles in the preset angle mapping table to obtain an updated angle mapping table; and determine the weight index corresponding to the sample in the current block in combination with the position information of the sample in the current block respectively according to the cosine angle index information, the sine angle index information and the updated angle mapping table.

In the embodiment of the present application, implementation of S2041-S2042 of the decoder is basically consistent with the process of implementing S1041-S1042 at the encoder side, and will not be repeated herein.

It can be understood that by looking up the weight mapping table through the obtained indices to obtain the corresponding weights, it can be found that angles Dis[displacementX] and Dis[displacementY] need to be multiplied in each of above steps of calculation, while in the present scheme, the weight mapping table is removed and a mathematical method is designed to implicitly reduce the weight mapping table by half. Therefore, the weight indices and motion indices need to be divided by 2 in each step of calculating the weight indices and motion indices. However, since values in the angle mapping table are all powers of 2, the operation in which the weight indices and motion indices are divided by 2 can be implemented by descending the power of the angle mapping table, which corresponds to the reduced weight mapping table.

In S208, a motion offset value is determined according to the cosine angle index information, the sine angle index information and the updated angle mapping table, and a motion abscissa offset value and a motion ordinate offset value corresponding to the current block are obtained according to the angle index information, the step size index information and the size information of the current block.

In S209, motion index information is obtained according to the motion offset value, the motion abscissa offset value, the motion ordinate offset value, the position information of the sample in the upper left corner of the current block, a first angle corresponding to the cosine angle index information and a second angle corresponding to the sine angle index information.

In S210, when an absolute value of the motion index information is less than half of a preset motion index threshold, the first motion information and the second motion information are determined as motion information of the current block.

In S211, when the motion index information is less than or equal to 0, the first motion information is determined as the motion information of the current block.

In S212, when the motion index information is greater than 0, the second motion information is determined as the motion information of the current block.

In S213, the motion information of the current block is stored in a preset merge candidate list.

In the embodiment of the present application, implementation of S208-S213 of the decoder is basically consistent with the process of implementing S108-S113 at the encoder side, and will not be repeated herein.

The preset motion index threshold is 32.

It can be understood that after the inter prediction method in accordance with the embodiment of the present application is implemented on VVC reference software VTM7.0_common_base based on GEO, a test sequence required for JVET is tested under the condition of random access, and there is no change in BD-rate in Y, Cb and Cr components (consistent with the Anchor performance). This data shows that this simplified scheme will not have any influence on the encoding performance, and decrease the storage of the weight table and simplify text description and implementation of codes. In terms of time complexity, because the predefined weight matrix of GEO is calculated only once for each sequence before the start of encoding and decoding, the operation of a ternary operator brought by the present scheme will not affect the overall encoding and decoding time complexity, that is to say, the time complexity remains basically unchanged.

Figure 10:
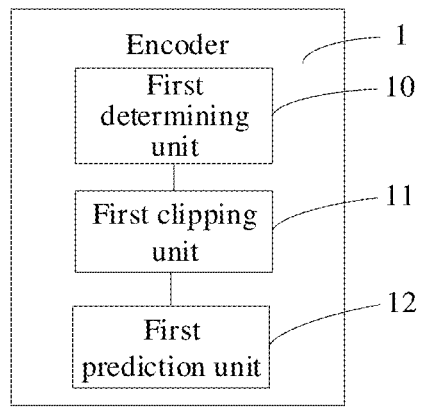
FIG. 10 is a schematic diagram of a first structure of an encoder in accordance with an embodiment of the present application.

As shown in FIG. 10, an embodiment of the present application provides an encoder 1 including a first determining unit 10, a first clipping unit 11 and a first prediction unit 12.

The first determining unit 10 is configured to determine a prediction mode parameter of a current block; determine a geometrical partitioning for inter blocks (GEO) parameter of the current block when the prediction mode parameter indicates that a GEO mode is used for determining inter prediction of the current block; determine a first prediction value corresponding to a first partition of the current block and a second prediction value corresponding to a second partition of the current block according to the GEO parameter; and determine a weight index corresponding to the sample in the current block according to the GEO parameter.

The first clipping unit 11 is configured to clip the weight index corresponding to the sample in the current block respectively to obtain absolute information of the weight index corresponding to the sample in the current block, wherein the clipping is to clip a maximum value among absolute values of weight indices corresponding to samples in the current block to half of a preset numerical value.

The first determining unit 10 is further configured to determine a first weight value of the sample in the current block and a second weight value of the sample in the current block based on the absolute information of the weight index corresponding to the sample in the current block.

The first prediction unit 12 is configured to perform weighted combination using the first prediction value, the first weight value, the second prediction value and the second weight value to obtain an inter prediction of the sample of the current block.

In some embodiments of the present application, the GEO parameter of the current block includes angle index information and size information of the current block.

The first determining unit 10 is further configured to determine position information of the sample in the current block according to the size information of the current block; and determine the weight index corresponding to the sample in the current block in combination with the position information of the sample in the current block respectively according to the angle index information and a preset angle mapping table.

In some embodiments of the present application, the first determining unit 10 is further configured to determine cosine angle index information and sine angle index information according to the angle index information; descend powers of angles in the preset angle mapping table to obtain an updated angle mapping table; and determine the weight index corresponding to the sample in the current block in combination with the position information of the sample in the current block respectively according to the cosine angle index information, the sine angle index information and the updated angle mapping table.

In some embodiments of the present application, the first determining unit 10 is further configured to, when the absolute information of the weight index is less than a preset index threshold, perform right shift of the absolute information of the weight index combined with a first numerical value by the preset binary digits and then add a preset weight numerical value to obtain weight values corresponding to the absolute information of the weight index; when the absolute information of the weight index is greater than or equal to the preset index threshold, perform right shift of the absolute information of the weight index combined with a second numerical value by the preset binary digits and then add the preset weight numerical value to obtain the weight values corresponding to the absolute information of the weight index; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the first determining unit 10 is further configured to, after the absolute information of the weight index is combined with a first numerical value and a value of whether the absolute information of the weight index is greater than 8, perform right shift by the preset binary digits, and finally add the preset weight numerical value to obtain the weight values corresponding to the absolute information of the weight index; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the first determining unit 10 is further configured to, after the absolute information of the weight index is combined with a first numerical value and a value obtained after a sign operation is performed on a value of subtracting the absolute information of the weight index from 8, perform right shift by the preset binary digits, and finally add the preset weight numerical value to obtain the weight values corresponding to the absolute information of the weight index; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the first determining unit 10 is further configured to obtain the weight values corresponding to the absolute information of the weight index by looking up a preset weight mapping table according to the absolute information of the weight index, wherein the preset weight mapping table is obtained by clipping respectively the weight index corresponding to the sample in the current block into half of the preset numerical value; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the first determining unit 10 is further configured to, when the absolute information of the weight index is less than the preset index threshold, perform right shift of the absolute information of the weight index combined with the first numerical value by the preset binary digits to obtain new weight indices; when the absolute information of the weight index is greater than or equal to the preset index threshold, perform right shift of the absolute information of the weight index combined with the second numerical value by the preset binary digits to obtain new weight indices; acquire new weight values corresponding to the new weight index information from the preset new weight mapping table; when the information of the weight index is less than or equal to 0, determine the new weight value as the weight value corresponding to the absolute information of the weight index; when the information of the weight index is greater than 0, determine a value of subtracting the new weight value as the weight value corresponding to the absolute information of the weight index; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the encoder 1 further includes a signalling unit 13 and a first storage unit 14 (neither of which is shown in the figure).

The signalling unit 13 is configured to, after performing weighted combination using the first prediction value, the first weight value, the second prediction value and the second weight value to obtain the inter prediction of the sample of the current block, write the angle index information into the bitstream.

The first determining unit 10 is further configured to determine a motion offset value according to the cosine angle index information, the sine angle index information and the updated angle mapping table, and obtain a motion abscissa offset value and a motion ordinate offset value corresponding to the current block according to the angle index information, the step size index information and the size information of the current block; obtain motion index information according to the motion offset value, the motion abscissa offset value, the motion ordinate offset value, the position information of the sample in an upper left corner of the current block, a first angle corresponding to the cosine angle index information, and a second angle corresponding to the sine angle index information; when an absolute value of the motion index information is less than half of a preset motion index threshold, determine the first motion information and the second motion information as motion information of the current block; when the motion index information is less than or equal to 0, determine the first motion information as the motion information of the current block;

and when the motion index information is greater than 0, determine the second motion information as the motion information of the current block.

The first storage unit 14 is configured to store the motion information of the current block in a preset merge candidate list.

In some embodiments of the present application, the preset numerical value is 26; the preset index threshold is 9; the first numerical value is 2; the second numerical value is 3; the preset weight numerical value is 4; the preset binary digits are 2; and the preset motion index threshold is 32.

Figure 11:
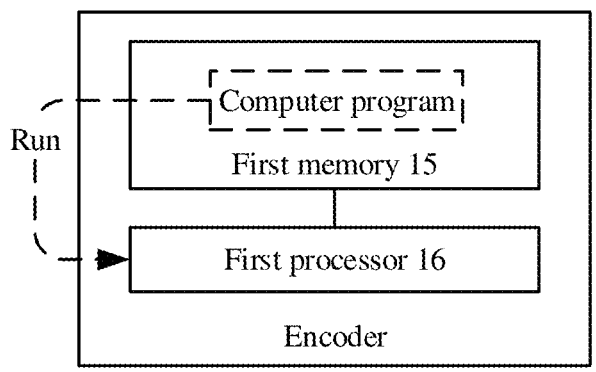
FIG. 11 is a schematic diagram of a second structure of an encoder in accordance with an embodiment of the present application.

In practical applications, as shown in FIG. 11, an embodiment of the present application further provides an encoder including: a first memory 15 and a first processor 16, wherein the first memory 15 stores therein a computer program runnable on the first processor 16, which, when executed by the first processor 16, implements the inter prediction method at the encoder side.

It can be understood that during inter prediction, the encoder can determine the weight index corresponding to the sample in the current block according to the GEO parameter, and then clip the maximum value among the absolute values of weight indices corresponding to samples in the current block to half of the preset numerical value through clipping processing of the absolute values, such that the size of the original clipping to half of the preset numerical value is reduced, thus the storage and use of the weight values corresponding to the absolute information of half of the weight indices are reduced, further simplifying texts and codes during inter prediction and decreasing the storage overhead of data.

Figure 12:
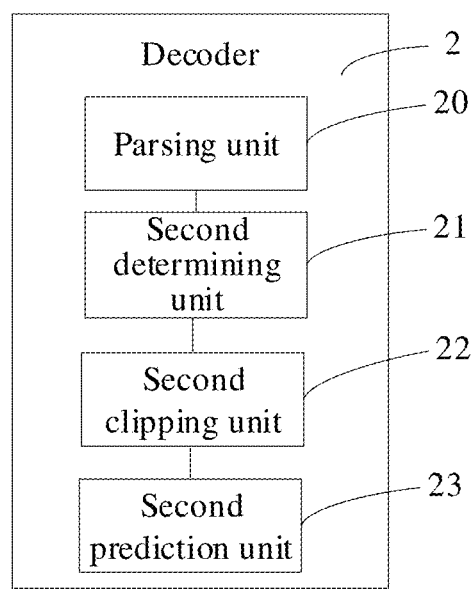
FIG. 12 is a schematic diagram of a first structure of a decoder in accordance with an embodiment of the present application.

As shown in FIG. 12, an embodiment of the present application further provides a decoder 2 including a parsing unit 20, a second determining unit 21 and a second clipping unit 22.

The parsing unit 20 is configured to parse a bitstream to determine a prediction mode parameter of a current block.

The second determining unit 21 is configured to parse the bitstream to determine a geometrical partitioning for inter blocks (GEO) parameter of the current block when the prediction mode parameter indicates that a GEO mode is used for determining inter prediction of the current block; determine a first prediction value corresponding to a first partition of the current block and a second prediction value corresponding to a second partition of the current block according to the GEO parameter; and determine a weight index corresponding to the sample in the current block according to the GEO parameter.

The second clipping unit 22 is configured to clip the weight index corresponding to the sample in the current block respectively to obtain absolute information of the weight index corresponding to the sample in the current block, wherein the clipping is to clip a maximum value among weight indices corresponding to samples in the current block to half of a preset numerical value.

The second determining unit 21 is further configured to determine a first weight value of the sample in the current block and a second weight value of the sample in the current block based on the absolute information of the weight index corresponding to the sample in the current block.

The second prediction unit 23 is configured to perform weighted combination using the first prediction value, the first weight value, the second prediction value and the second weight value to obtain an inter prediction of the sample of the current block.

In some embodiments of the present application, the GEO parameter of the current block includes angle index information and size information of the current block.

The second determining unit 21 is further configured to determine position information of the sample in the current block according to the size information of the current block; and determine the weight index corresponding to the sample in the current block in combination with the position information of the sample in the current block respectively according to the angle index information and a preset angle mapping table.

In some embodiments of the present application, the second determining unit 21 is further configured to determine cosine angle index information and sine angle index information according to the angle index information; descend powers of angles in the preset angle mapping table to obtain an updated angle mapping table; and determine the weight index corresponding to the sample in the current block in combination with the position information of the sample in the current block respectively according to the cosine angle index information, the sine angle index information and the updated angle mapping table.

In some embodiments of the present application, the second determining unit 21 is further configured to, when the absolute information of the weight index is less than a preset index threshold, perform right shift of the absolute information of the weight index combined with a first numerical value by the preset binary digits and then add a preset weight numerical value to obtain weight values corresponding to the absolute information of the weight index; when the absolute information of the weight index is greater than or equal to the preset index threshold, perform right shift of the absolute information of the weight index combined with a second numerical value by the preset binary digits and then add the preset weight numerical value to obtain the weight values corresponding to the absolute information of the weight index; determine the first weight value of the sample in the current block corresponding to the first partition according to the weight values corresponding to the absolute information of the weight index and the weight index corresponding to the sample in the current block; and obtain the second weight value of the sample in the current block corresponding to the second partition according to the first weight value.

In some embodiments of the present application, the second determining unit 21 is further configured to, after the absolute information of the weight index is combined with a first numerical value and a value of whether the absolute information of the weight index is greater than 8, perform right shift by the preset binary digits, and finally add the preset weight numerical value to obtain the weight values corresponding to the absolute information of the weight index; determine the first weight value of the samples in the current block corresponding to the first partition according to the weight values corresponding to the absolute information of the weight index and the weight index corresponding to the sample in the current block; and obtain the second weight value of the sample in the current block corresponding to the second partition according to the first weight value.

In some embodiments of the present application, the second determining unit 21 is further configured to, after the absolute information of the weight indices is combined with a first numerical value and a value obtained after a sign operation is performed on a value of subtracting the absolute information of the weight index from 8, perform right shift by the preset binary digits, and finally add the preset weight numerical value to obtain the weight values corresponding to the absolute information of the weight index; determine the first weight value of the sample in the current block corresponding to the first partition according to the weight values corresponding to the absolute information of the weight index and the weight index corresponding to the sample in the current block; and obtain the second weight value of the sample in the current block corresponding to the second partition according to the first weight value.

In some embodiments of the present application, the second determining unit 21 is further configured to obtain the weight values corresponding to the absolute information of the weight index by looking up a preset weight mapping table according to the absolute information of the weight index, wherein the preset weight mapping table is obtained by clipping respectively the weight indices corresponding to the samples in the current block into half of the preset numerical value; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the second determining unit 21 is further configured to, when the absolute information of the weight index is less than the preset index threshold, perform right shift of the absolute information of the weight index combined with the first numerical value by the preset binary digits to obtain new weight index information; when the absolute information of the weight index is greater than or equal to the preset index threshold, perform right shift of the absolute information of the weight index combined with the second numerical value by the preset binary digits to obtain new weight index information; acquire new weight values corresponding to the new weight index information from the preset new weight mapping table; when the information of the weight index is less than or equal to 0, determine the new weight value as the weight value corresponding to the absolute information of the weight index; when the information of the weight index is greater than 0, determine a value of subtracting the new weight value from 8 as the weight value corresponding to the absolute information of the weight index; determine the first weight value of the sample in the current block corresponding to the first partition according to the weight value corresponding to the absolute information of the weight index and the weight index corresponding to the sample in the current block; and obtain the second weight value of the sample in the current block corresponding to the second partition according to the first weight value.

In some embodiments of the present application, the decoder 2 further includes a second storage unit 24 (which is shown in the figure).

The second determining unit 21 is further configured to, after performing weighted combination using the first unidirectional prediction value, the first weight value, the second unidirectional prediction value and the second weight value to obtain a prediction value of the sample of the current block, determine a motion offset value according to the cosine angle index information, the sine angle index information and the updated angle mapping table, and obtain a motion abscissa offset value and a motion ordinate offset value corresponding to the current block according to the angle index information, the step size index information and the size information of the current block; obtain motion index information according to the motion offset value, the motion abscissa offset value, the motion ordinate offset value, the position information of the sample in an upper left corner of the current block, a first angle corresponding to the cosine angle index information, and a second angle corresponding to the sine angle index information; when an absolute value of the motion index information is less than half of a preset motion index threshold, determine the first motion information and the second motion information as motion information of the current block; when the motion index information is less than or equal to 0, determine the first motion information as the motion information of the current block; and when the motion index information is greater than 0, determine the second motion information as the motion information of the current block.

The second storage unit 24 is configured to store the motion information of the current block in a preset merge candidate list.

In some embodiments of the present application, the preset numerical value is 26; the preset index threshold is 9; the first numerical value is 2; the second numerical value is 3; the preset weight numerical value is 4; the preset binary digits are 2; and the preset motion index threshold is 32.

Figure 13:
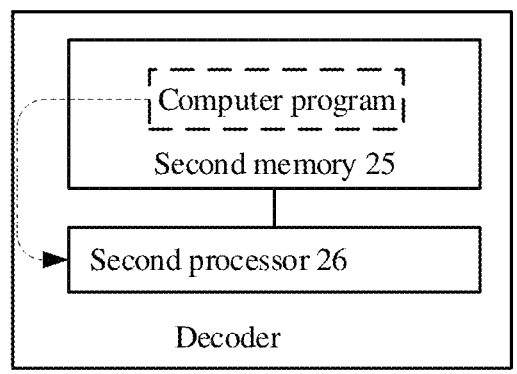
FIG. 13 is a schematic diagram of a second structure of a decoder in accordance with an embodiment of the present application.

In practical applications, as shown in FIG. 13, an embodiment of the present application further provides a decoder including: a second memory 25 and a second processor 26, wherein the second memory 25 stores therein a computer program runnable on the second processor 26, which, when executed by the second processor 26, implements the inter prediction method at the decoder side.

It can be understood that during inter prediction, the decoder can determine the weight index corresponding to the sample in the current block according to the GEO parameter, and then clip the maximum value among the absolute values of weight indices corresponding to samples in the current block to half of the preset numerical value through clipping processing of the absolute values, such that the size of the original clipping to half of the preset numerical value is reduced, thus the storage and use of the weight values corresponding to the absolute information of half of the weight indices are reduced, further simplifying texts and codes during inter prediction and decreasing the storage overhead of data.

Accordingly, an embodiment of the present application provides a storage medium storing therein a computer program, which, when executed by the first processor, implements the inter prediction method of the encoder; or when executed by the second processor, implements the inter prediction method of the decoder.

It should be pointed out herein that the descriptions of the above storage medium and the device embodiments are similar to the description of the above method embodiments, and have similar beneficial effects to the method embodiments. Technical details not disclosed in the storage medium and the device embodiments of the present application will be understood with reference to the description of the method embodiments of the present application.

What are described above is merely implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

INDUSTRIAL APPLICABILITY

In the embodiments of the present application, during inter prediction, the weight index corresponding to the sample in the current block can be determined according to the GEO parameter, and then the maximum value among the absolute values of weight indices corresponding to samples in the current block is clipped to half of the preset numerical value through clipping processing of the absolute values, such that the size of the original clipping to half of the preset numerical value is reduced, thus the storage and use of the weight values corresponding to the absolute information of half of the weight indices are reduced, further simplifying texts and codes during inter prediction and decreasing the storage overhead of data.

The invention claimed is:

1. An inter prediction method, applied to an encoder, comprising:
   determining a prediction mode parameter of a current block;
   determining a geometrical partitioning prediction mode parameter of the current block when the prediction mode parameter indicates that a geometrical partitioning prediction mode is used for determining inter prediction of the current block;
   determining a first prediction value of a sample in the current block and a second prediction value of a sample in the current block according to the geometrical partitioning prediction mode parameter; wherein the first prediction value is obtained through prediction performed based on first motion information corresponding to a first index of the current block, and the second prediction value is obtained through prediction performed based on second motion information corresponding to a second index of the current block;
   determining a weight index corresponding to the sample in the current block according to the geometrical partitioning prediction mode parameter;
   clipping the weight index corresponding to the sample in the current block to obtain absolute information of the weight index corresponding to the sample in the current block;
   determining a first weight value of the sample in the current block and a second weight value of the sample in the current block based on the absolute information of the weight index corresponding to the sample in the current block; and
   determining an inter prediction of the sample of the current block according to weighted combination of the first prediction value, the first weight value, the second prediction value and the second weight value.

2. The method according to claim 1, wherein the geometrical partitioning prediction mode parameter of the current block comprises angle index information and size information of the current block; determining the weight index corresponding to the sample in the current block according to the geometrical partitioning prediction mode parameter comprises:
   determining position information of the sample in the current block according to the size information of the current block; and
   determining the weight index corresponding to the sample in the current block according to the angle index information, a preset angle mapping table and the position information of the sample in the current block.

3. The method according to claim 2, wherein determining the weight index corresponding to the sample in the current block according to the angle index information, the preset angle mapping table and the position information of the sample in the current block comprises:
   determining cosine angle index information and sine angle index information according to the angle index information;
   descending powers of angles in the preset angle mapping table to obtain an updated angle mapping table; and
   determining the weight index corresponding to the sample in the current block according to the cosine angle index information, the sine angle index information, the updated angle mapping table and the position information of the sample in the current block.

4. The method according to claim 1, wherein determining the first weight value of the sample in the current block and the second weight value of the sample in the current block based on the absolute information of the weight index corresponding to the sample in the current block comprises:
   when the absolute information of the weight index is less than a preset index threshold, performing right shift of the absolute information of the weight index combined with a first numerical value by preset binary digits and then adding a preset weight numerical value to the value obtained after right shift to obtain a weight value corresponding to the absolute information of the weight index;
   when the absolute information of the weight index is greater than or equal to the preset index threshold, performing right shift of the absolute information of the weight index combined with a second numerical value by preset binary digits and then adding the preset weight numerical value to a value obtained after right shift to obtain a weight value corresponding to the absolute information of the weight index;
   determining the first weight value of the sample in the current block corresponding to the first index according to the weight value corresponding to the absolute information of the weight index and the weight index corresponding to the sample in the current block; and
   obtaining the second weight value of the sample in the current block corresponding to the second index according to the first weight value.

5. The method according to claim 1, wherein determining the first weight value of the sample in the current block and the second weight value of the sample in the current block based on the absolute information of the weight index corresponding to the sample in the current block comprises:
   performing right shift of the absolute information of the weight index combined with a first numerical value or a third numerical value by preset binary digits, and then adding a preset weight numerical value to a value obtained after right shift to obtain a weight value corresponding to the absolute information of the weight index;
   determining the first weight value of the sample in the current block corresponding to the first index according to the weight value corresponding to the absolute information of the weight index and the weight index corresponding to the sample in the current block; and
   obtaining the second weight value of the sample in the current block corresponding to the second index according to the first weight value.

6. The method according to claim 3, wherein after the determining an inter prediction of the sample of the current block according to weighted combination of the first prediction value, the first weight value, the second prediction value and the second weight value, the method further comprises:
   signalling the angle index information into the bitstream;
   determining a first angle corresponding to the cosine angle index information, and a second angle corresponding to the sine angle index information according to the cosine angle index information, the sine angle index information and the updated angle mapping table, and obtaining a motion abscissa offset value and a motion ordinate offset value corresponding to the current block according to the angle index information, step size index information and the size information of the current block;
   obtaining motion index information of a sub-block in the current block according to the motion abscissa offset value, the motion ordinate offset value, the position information of the sample in an upper left corner of the current block, a first angle corresponding to the cosine angle index information, and a second angle corresponding to the sine angle index information;
   when an absolute value of the motion index information is less than half of a preset motion index threshold, determining the first motion information and the second motion information as motion information of the current sub-block;
   when the motion index information is less than or equal to 0, determining the first motion information as the motion information of the current sub-block;
   when the motion index information is greater than 0, determining the second motion information as the motion information of the current sub-block;
   storing the motion information of the sub-block in the current block for construction of a candidate list.

7. An inter prediction method, applied to a decoder, comprising:
   parsing a bitstream to determine a prediction mode parameter of a current block;
   parsing the bitstream to determine a geometrical partitioning prediction mode parameter of the current block when the prediction mode parameter indicates that a geometrical partitioning prediction mode is used for determining an inter prediction of the current block;
   determining a first prediction value of a sample in the current block and a second prediction value of a sample in the current block according to the geometrical partitioning prediction mode parameter; wherein the first prediction value is obtained through prediction performed based on first motion information corresponding to a first index of the current block, and the second prediction value is obtained through prediction performed based on second motion information corresponding to a second index of the current block;
   determining a weight index corresponding to the sample in the current block according to the geometrical partitioning prediction mode parameter;
   clipping the weight index corresponding to the sample in the current block to obtain absolute information of the weight index corresponding to the sample in the current block;
   determining a first weight value of the sample in the current block and a second weight value of the sample in the current block based on the absolute information of the weight index corresponding to the sample in the current block; and
   determining an inter prediction of the sample of the current block according to weighted combination of the first prediction value, the first weight value, the second prediction value and the second weight value.

8. The method according to claim 7, wherein the geometrical partitioning prediction mode parameter of the current block comprises angle index information and size information of the current block; determining the weight index corresponding to sample in the current block according to the geometrical partitioning prediction mode parameter comprises:
   determining position information of the sample in the current block according to the size information of the current block; and
   determining the weight index corresponding to the sample in the current block according to the angle index information, a preset angle mapping table and the position information of the sample in the current block.

9. The method according to claim 8, wherein determining the weight index corresponding to the sample in the current block according to the angle index information, the preset angle mapping table and the position information of the sample in the current block comprises:
   determining cosine angle index information and sine angle index information according to the angle index information;
   descending powers of angles in the preset angle mapping table to obtain an updated angle mapping table; and
   determining the weight index corresponding to the sample in the current block according to the cosine angle index information, the sine angle index information, the updated angle mapping table and the position information of the sample in the current block.

10. The method according to claim 7, wherein determining the first weight value of the sample in the current block and the second weight value of the sample in the current block based on the absolute information of the weight index corresponding to the sample in the current block comprises:
   when the absolute information of the weight index is less than a preset index threshold, performing right shift of the absolute information of the weight index combined with a first numerical value by preset binary digits and then adding a preset weight numerical value to the value obtained after right shift to obtain a weight value corresponding to the absolute information of the weight index;
   when the absolute information of the weight index is greater than or equal to the preset index threshold, performing right shift of the absolute information of the weight index combined with a second numerical value by preset binary digits and then adding the preset weight numerical value to a value obtained after right shift to obtain a weight value corresponding to the absolute information of the weight index;
   determining the first weight value of the sample in the current block corresponding to the first index according to the weight value corresponding to the absolute information of the weight index and the weight index corresponding to the sample in the current block; and
   obtaining the second weight value of the sample in the current block corresponding to the second index according to the first weight value.

11. The method according to claim 7, wherein determining the first weight value of the sample in the current block and the second weight value of the sample in the current block based on the absolute information of the weight index corresponding to the sample in the current block comprises:
   performing right shift of the absolute information of the weight index combined with a first numerical value or a third numerical value by preset binary digits, and then adding a preset weight numerical value to a value obtained after right shift to obtain a weight value corresponding to the absolute information of the weight index;

determining the first weight value of the sample in the current block corresponding to the first index according to the weight value corresponding to the absolute information of the weight index and the weight index corresponding to the sample in the current block; and obtaining the second weight value of the sample in the current block corresponding to the second index according to the first weight value.

12. The method according to claim 9, wherein after the determining an inter prediction of the sample of the current block according to weighted combination of the first prediction value, the first weight value, the second prediction value and the second weight value, the method further comprises:

determining a first angle corresponding to the cosine angle index information, and a second angle corresponding to the sine angle index information according to the cosine angle index information, the sine angle index information and the updated angle mapping table, and obtaining a motion abscissa offset value and a motion ordinate offset value corresponding to the current block according to the angle index information, step size index information and the size information of the current block;

obtaining motion index information of a sub-block in the current block according to the motion abscissa offset value, the motion ordinate offset value, the position information of the sample in an upper left corner of the current block, a first angle corresponding to the cosine angle index information, and a second angle corresponding to the sine angle index information;

when an absolute value of the motion index information is less than half of a preset motion index threshold, determining the first motion information and the second motion information as motion information of the current sub-block;

when the motion index information is less than or equal to 0, determining the first motion information as the motion information of the current sub-block;

when the motion index information is greater than 0, determining the second motion information as the motion information of the current sub-block; and storing the motion information of the sub-block in the current block for construction of a candidate list.

13. An encoder comprising:

a first memory and a first processor, wherein the first memory stores therein a computer program runnable on the first processor, which, when executed by the first processor, implements the inter prediction method according to claim 1.

14. A decoder comprising:

a second memory and a second processor, wherein the second memory stores therein a computer program runnable on the second processor, which, when executed by the second processor, implements the inter prediction method according to claim 7.

15. A computer-readable non-transitory storage medium storing therein a computer program, which, when executed by a first processor, implements the inter prediction method according to claim 1.

16. A computer-readable non-transitory storage medium storing therein a computer program, which, when executed by a second processor, implements the inter prediction method according to claim 7.

* * * * *